(12) United States Patent
Carlson et al.

(10) Patent No.: US 11,084,205 B2
(45) Date of Patent: Aug. 10, 2021

(54) OPERATION OF PRINTING NOZZLES IN ADDITIVE MANUFACTURE AND APPARATUS FOR CLEANING PRINTING NOZZLES

(71) Applicant: Stratasys Ltd., Rehovot (IL)

(72) Inventors: Andrew James Carlson, Hopkins, MN (US); Nathaniel Michael Peterson, Champlin, MN (US); Alexander Libinson, Holon (IL); Adam Joseph Livingston, Oceanside, CA (US); Scott Wayne Beaver, San Marcos, CA (US)

(73) Assignee: Stratasys Ltd., Rehovot (IL)

( * ) Notice: Subject to any disclaimer, the term of this patent is extended or adjusted under 35 U.S.C. 154(b) by 215 days.

(21) Appl. No.: 15/742,967

(22) PCT Filed: Jul. 13, 2016

(86) PCT No.: PCT/IL2016/050751
§ 371 (c)(1),
(2) Date: Jan. 9, 2018

(87) PCT Pub. No.: WO2017/009830
PCT Pub. Date: Jan. 19, 2017

(65) Prior Publication Data
US 2019/0084239 A1    Mar. 21, 2019

Related U.S. Application Data

(60) Provisional application No. 62/191,703, filed on Jul. 13, 2015.

(51) Int. Cl.
*B29C 64/10*    (2017.01)
*B29C 64/112*    (2017.01)
(Continued)

(52) U.S. Cl.
CPC .......... *B29C 64/112* (2017.08); *B29C 64/209* (2017.08); *B29C 64/227* (2017.08);
(Continued)

(58) Field of Classification Search
CPC ..... B29C 64/386; B29C 64/112; B29C 64/20; B29C 64/209; B29C 64/35; B29C 64/106;
(Continued)

(56) References Cited

U.S. PATENT DOCUMENTS

| 5,837,960 A | 11/1998 | Lewis et al. |
| 6,259,962 B1 | 7/2001 | Gothait |

(Continued)

FOREIGN PATENT DOCUMENTS

| CN | 1832847 | 9/2006 |
| CN | 2014-533627 | 12/2014 |

(Continued)

OTHER PUBLICATIONS

European Search Report and the European Search Opinion dated Jun. 18, 2019 From the European Patent Office Re. Application No. 19167262.5. (9 Pages).

(Continued)

*Primary Examiner* — Joseph S Del Sole
*Assistant Examiner* — Jamel M Nelson

(57) ABSTRACT

A method of providing nozzle calibration parameters for a 3D printer comprises: printing an arc pattern, printing an X-Y align pattern, and printing a head calibration pattern, measuring actual positions of drops, calculating deviations of said measured actual positions from expected positions, and calculating calibration parameters to correct for the deviations. Indicator drops may be used to allow built-in image recognition to find the calibration drops, and a cam system is provided to guide nozzle wipers.

7 Claims, 22 Drawing Sheets

(51) Int. Cl.
  *B41J 2/165* (2006.01)
  *B33Y 10/00* (2015.01)
  *B33Y 30/00* (2015.01)
  *B33Y 50/02* (2015.01)
  *B33Y 40/00* (2020.01)
  *B29C 64/35* (2017.01)
  *B41J 2/175* (2006.01)
  *B29C 64/227* (2017.01)
  *B29C 64/209* (2017.01)

(52) U.S. Cl.
  CPC ............. *B29C 64/35* (2017.08); *B33Y 10/00* (2014.12); *B33Y 30/00* (2014.12); *B33Y 40/00* (2014.12); *B33Y 50/02* (2014.12); *B41J 2/16538* (2013.01); *B41J 2/16544* (2013.01); *B41J 2/16579* (2013.01); *B41J 2/16588* (2013.01); *B41J 2/175* (2013.01)

(58) Field of Classification Search
  CPC ... B29C 64/241; B29C 64/227; B29C 64/393; B33Y 10/00; B33Y 30/00; B33Y 40/00; B33Y 50/00; B33Y 50/02; B41J 2/16538; B41J 2/16544; B41J 2/16579; B41J 2/16588; B41J 2/175
  See application file for complete search history.

(56) References Cited

U.S. PATENT DOCUMENTS

| | | | |
|---|---|---|---|
| 6,569,373 | B2 | 5/2003 | Napadensky |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,291,002 | B2 | 11/2007 | Russell et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,658,976 | B2 | 2/2010 | Kritchman |
| 7,962,237 | B2 | 6/2011 | Kritchman |
| 8,172,562 | B2 | 5/2012 | Mattes |
| 9,002,496 | B2 | 4/2015 | Elsey |
| 9,364,995 | B2 | 6/2016 | Roberts, IV et al. |
| 9,849,631 | B1 | 12/2017 | Goss et al. |
| 2001/0035886 | A1* | 11/2001 | Bradshaw ............... B41J 3/407 347/2 |
| 2004/0265413 | A1 | 12/2004 | Russell et al. |
| 2005/0015175 | A1 | 1/2005 | Huang |
| 2006/0061618 | A1 | 3/2006 | Hernandez et al. |
| 2006/0127153 | A1 | 6/2006 | Menchik et al. |
| 2008/0018689 | A1 | 1/2008 | Ito et al. |
| 2008/0042321 | A1 | 2/2008 | Russell et al. |
| 2008/0109102 | A1 | 5/2008 | Sutcliffe |
| 2008/0138454 | A1 | 6/2008 | Perret et al. |
| 2009/0025638 | A1 | 1/2009 | Inoue |
| 2009/0109274 | A1 | 4/2009 | Hori et al. |
| 2009/0231374 | A1* | 9/2009 | Van de Wynckel ............... H04N 1/00031 347/12 |
| 2010/0140852 | A1 | 6/2010 | Kritchman et al. |
| 2010/0191360 | A1 | 7/2010 | Napadensky et al. |
| 2013/0126657 | A1 | 5/2013 | Stroik, Jr. |
| 2013/0189435 | A1 | 7/2013 | Mackie et al. |
| 2013/0242317 | A1 | 9/2013 | Leavitt et al. |
| 2015/0017272 | A1 | 1/2015 | Donaldson et al. |
| 2016/0339724 | A1 | 11/2016 | Munenaka et al. |
| 2017/0100898 | A1 | 4/2017 | Cofler et al. |
| 2017/0173886 | A1 | 6/2017 | Menchik et al. |
| 2017/0232680 | A1 | 8/2017 | Skogsrud et al. |
| 2017/0348902 | A1 | 12/2017 | Ohara et al. |
| 2018/0085995 | A1 | 3/2018 | Davis |
| 2018/0111322 | A1 | 4/2018 | Mathea |
| 2018/0141267 | A1 | 5/2018 | Dudley |
| 2018/0200956 | A1 | 7/2018 | Grach et al. |
| 2018/0201021 | A1 | 7/2018 | Beaver et al. |
| 2018/0207875 | A1 | 7/2018 | Menchik |
| 2018/0370133 | A1 | 12/2018 | Provencher |
| 2020/0230938 | A1 | 7/2020 | Menchik et al. |

FOREIGN PATENT DOCUMENTS

| | | | |
|---|---|---|---|
| CN | 104210108 | 12/2014 | |
| EP | 0604068 | 6/1994 | |
| EP | 0860283 | 8/1998 | |
| EP | 2835249 | 2/2015 | |
| JP | 06-198746 | 7/1994 | |
| JP | 2002-512140 | 4/2002 | |
| JP | 2005-133120 | 5/2005 | |
| JP | 2006-526524 | 11/2006 | |
| JP | 2007-503342 | 2/2007 | |
| JP | 2008-047272 | 2/2008 | |
| JP | 2008-513199 | 5/2008 | |
| JP | 2009-066882 | 4/2009 | |
| JP | 2009-083326 | 4/2009 | |
| JP | 2012-228793 | 11/2012 | |
| JP | 2012-526687 | 11/2012 | |
| JP | 2014-514193 | 6/2014 | |
| JP | 2014-136217 | 7/2014 | |
| JP | 2016-074205 | 5/2016 | |
| WO | WO 99/54141 | 10/1999 | |
| WO | WO 2004/024447 | 3/2004 | |
| WO | WO-2004024447 A2 * | 3/2004 | ............ B33Y 30/00 |
| WO | WO 2004/106041 | 12/2004 | |
| WO | WO 2004/108398 | 12/2004 | |
| WO | WO 2007/114142 | 10/2007 | |
| WO | WO 2009//041707 | 4/2009 | |
| WO | WO 2010/132392 | 11/2010 | |
| WO | WO 2012/143923 | 10/2012 | |
| WO | WO 2014/092651 | 6/2014 | |
| WO | WO 2015/026847 | 2/2015 | |
| WO | WO 2016/009426 | 1/2016 | |
| WO | WO 2017/009830 | 1/2017 | |

OTHER PUBLICATIONS

Translation dated Apr. 17, 2019 of Notification of Office Action dated Apr. 11, 2019 From the State Intellectual Property Office of the People's Republic of China Re. Application No. 201680040695. 3. (3 Pages).
Notification of Office Action dated Sep. 4, 2019 From the State Intellectual Property Office of the People's Republic of China Re. Application No. 201680040695.3. (3 Pages).
Translation dated Sep. 12, 2019 of Notification of Office Action dated Sep. 4, 2019 From the State Intellectual Property Office of the People's Republic of China Re. Application No. 201680040695.3. (4 Pages).
Notification of Office Action and Search Report dated Apr. 11, 2019 From the State Intellectual Property Office of the People's Republic of China Re. Application No. 201680040695.3. (7 Pages).
Official Action dated Jan. 24, 2019 From the US Patent and Trademark Office Re. U.S. Appl. No. 15/325,760. (29 Pages).
Communication Relating to the Results of the Partial International Search dated Oct. 6, 2016 From the International Searching Authority Re. Application No. PCT/IL2016/050751.
International Preliminary Report on Patentability dated Jan. 25, 2018 From the International Bureau of WIPO Re. Application No. PCT/IL2016/050751. (11 Pages).
International Preliminary Report on Patentability dated Jan. 26, 2017 From the International Bureau of WIPO Re. Application No. PCT/IL2015/050722.
International Search Report and the Written Opinion dated Nov. 16, 2015 From the International Searching Authority Re. Application No. PCT/IL2015/050722.
International Search Report and the Written Opinion dated Dec. 19, 2016 From the International Searching Authority Re. Application No. PCT/IL2016/050751. (18 Pages).

(56) References Cited

OTHER PUBLICATIONS

Supplementary European Search Report and the European Search Opinion dated Feb. 9, 2018 From the European Patent Office Re. Application No. 15821817.2. (6 Pages).
3Ders "Rotary 3D Printers Under Development", 3D Printer News & 3D Printing News, Product Description, 3Ders, 8 P., Dec. 27, 2013.
Dudley et al. "Orange Maker™. High-Resolution 3D Printing Technology", Orange Maker, Product Description, 8 P., Jun. 30, 2014.
Communication Pursuant to Article 94(3) EPC dated Jan. 20, 2020 From the European Patent Office Re. Application No. 16741396.2. (3 Pages).
Notice of Reason for Rejection dated Mar. 13, 2020 From the Japan Patent Office Re. Application No. 2018-501977 and Its Translation Into English. (5 Pages).
Notification of Office Action dated Jul. 19, 2019 From the State Intellectual Property Office of the People's Republic of China Re. Application No. 201580049088.9. (8 Pages).
Official Action dated Aug. 5, 2019 From the US Patent and Trademark Office Re. U.S. Appl. No. 15/325,760 (29 pages).
Translation dated Jul. 25, 2019 of Notification of Office Action dated Jul. 19, 2019 From the State Intellectual Property Office of the People's Republic of China Re. Application No. 201580049088.9. (11 Pages).
Notification of Reasons for Rejection dated Oct. 2, 2018 From the Japan Patent Office Re. Application No. 2017-501655 and Its Translation Into English. (10 Pages).
Notice of Reasons for Rejection dated Nov. 4, 2020 From the Japan Patent Office Re. Application No. 2019-172733 and Its Translation Into English. (13 Pages).
Communication Pursuant to Article 94(3) EPC dated Sep. 4, 2020 From the European Patent Office Re. Application No. 16741396.2. (5 Pages)
Grounds for Rejection dated Jul. 22, 2020 From the Korean Intellectual Property Office Re. Application No. 10-2017-7003591 and Its Translation Into English. (5 Pages).
Office Action dated Aug. 26, 2020 From the Israel Patent Office Re. Application No. 250096 and Its Translation Into English.(8 Pages).
Notification of Office Action dated Apr. 8, 2020 From the State Intellectual Property Office of the People's Republic of China Re. Application No. 201580049088.9 and Its Translation Into English. (4 Pages).
Office Action dated May 23, 2021 From the Israel Patent Office Re. Application No. 256866 and Its Translation Into English. (11 Pages).

\* cited by examiner

530
Calibration pixel
(drop)

Auxiliary mark
540

OPERATION OF PRINTING NOZZLES IN ADDITIVE MANUFACTURE AND APPARATUS FOR CLEANING PRINTING NOZZLES

RELATED APPLICATIONS

This application is a National Phase of PCT Patent Application No. PCT/IL2016/050751 having International filing date of Jul. 13, 2016, which claims the benefit of priority under 35 USC § 119(e) of U.S. Provisional Patent Application No. 62/191,703 filed on Jul. 13, 2015. The contents of the above applications are all incorporated by reference as if fully set forth herein in their entirety.

FIELD AND BACKGROUND OF THE INVENTION

The present invention, in some embodiments thereof, relates to operation of printing nozzles in additive manufacture and, more particularly, but not exclusively, to the accurate and failure free operation of the nozzles.

Nozzles are an important part of a 3D printer and serve the purpose of producing jets of ink droplets which land at specified locations to form the product. In order for the ink to land at the specified location the nozzle must first of all be kept clean of debris which can disrupt the jet and cause it to miss the target, or worse still can block the nozzle altogether, and secondly the nozzle must be correctly calibrated to send the ink to the correct location.

In general, calibration involves printing from known locations, measuring the actual printing achieved and using the difference to create a correction parameter. The correction parameter may then be used to modify the print file or the model. International Patent Application WO2004024447 teaches printing calibration structures and then measuring properties of the structures in order to generate calibration parameters. Other prior art uses test blocks to calculate the actual position of the nozzles. WO 2000052624 A1 teaches calibrating by printing a test layer.

The position of a single drop fired by a nozzle however cannot be reliably detected since a single drop is very small and indistinct, which makes it difficult to obtain calibration parameters that can be directly used with the model of FIG. 4. It is thus not possible to determine the vectors $\vec{R}_0 + \vec{C}_c$ describing positions of the printing heads with respect to the center of the tray, as shown in FIG. 4.

Referring now to nozzle itself, the printhead nozzle plate becomes dirty with resin droplets during printing and priming processes. The excess resin, along with any other particles, must be removed for the nozzles to function properly.

Current 3D printers use a rubber wiper blade, which provides an effective tool to clean the nozzle plate by wiping along the nozzle plate and squeezing off excess material.

However, the nozzle plate edges are very sharp and can tear the softer rubber material as it engages the nozzle plate. Damage to the wiper blade from sliding across the sharp edges of the nozzle plate prevents effective cleaning of the nozzle plate.

During the wiping motion, the wiper blade also wipes along the printhead latches, causing resin to be deposited onto the latches which may build up over time and affect printing.

Current solutions include lifting the wiper assembly up with a motor to contact the nozzle plate once the sharp edge has passed the wiper. However the solution requires more parts including an extra motor and thus introduces complexity and cost. A further solution currently in use is to push the wiper assembly downwards to clear the sharp edges then let it lift back up to engage the printhead. However the solution does not allow a full wipe of the nozzle plate, so that resin buildup may occur.

SUMMARY OF THE INVENTION

The present embodiments run the wiper on a shaped cam, thus allowing close and effective wiping around the nozzles without endangering the wipers on sharp edges.

The individual nozzles are calibrated by printing individual calibration droplets together with nearby indicator signs to assist image processing in correctly identifying the droplets.

Several sets of drops are printed for determination of different calibration parameters. A first set is printed with the same nozzle of a given printing head at several rotation angles of the platter and the single radial position of the printing block. The drops are expected to belong to the circular arc which center determines the position of the platter rotation center.

A second set involves printing drops using the same nozzle of the reference printing head at a single rotation angle of the platter, but moving between different radial positions of the printing block. The drops are expected to belong to the same radial line which position with respect to the found platter rotation center determines the $\vec{R}_0$ vector of FIG. 4.

A third set involves printing drops from several nozzles of all printing heads at the same rotation angle of the platter and a single radial position of the printing block. The drops, for each channel would be expected to belong to the straight segment determined by the head's position and direction ($\vec{C}_c, \vec{N}_c$ vectors in FIG. 4).

The configurations of the pixels corresponding to the fired drops at the each step are referred below as the "calibration patterns". The extent to which the lines deviate from the expected lines give rise to correction parameters.

According to an aspect of some embodiments of the present invention there is provided a method of providing nozzle calibration parameters for a 3D printer with rotating platter comprising:

printing an arc pattern using one nozzle of a given printing head at a plurality of rotation angles of a printing platter and a single radial position of a printing block;

printing an X-Y align pattern using one nozzle of one reference printing head at a single rotation angle of a printing platter, and moving between different radial positions of the printing block to print a plurality of drops expected to belong to a same radial line;

printing a head calibration pattern, the third pattern formed by printing drops from a plurality of nozzles of a plurality of printing heads, each drop being printed at a same rotation angle of a printing platter and a single radial position of a printing block;

measuring actual positions of drops in the patterns;

calculating deviations of the measured actual positions from expected positions; and calculating calibration parameters to correct for the deviations.

According to a second aspect of the present invention there is provided a method of providing nozzle calibration parameters for a 3D printer with rotating platter comprising:

printing a calibration drop from a nozzle being calibrated; and printing an indicator near the calibration drop to enable the calibration drop to be detected.

An embodiment may provide for printing a first, arc, calibration pattern using one nozzle of a given printing head at a plurality of rotation angles of a printing platter and a single radial position of a printing block, thereby to form a pattern of drops expected to belong to a circular arc which center determines a center of rotation of the printing platter, the method further comprising subtracting coordinates of the center of rotation from measured positions.

A further embodiment may comprise printing a second, X-Y alignment, calibration pattern, using one nozzle of one reference printing head at a single rotation angle of a printing platter, and moving between different radial positions of the printing block to print a plurality of drops expected to belong to a same radial line, a position of the radial line with respect to a measured platter center of rotation determining a vector $\bar{R}$ as a calibration shift parameter and rotating measured positions by the shift.

A yet further embodiment may comprise printing a third, head, calibration pattern, the third pattern formed by printing drops from a plurality of nozzles of a plurality of printing heads, each drop being printed at a same rotation angle of a printing platter and a single radial position of a printing block, the drops being expected to belong to a straight segment determined by a printing head position and direction.

The above embodiments may be combined as in the first aspect.

An embodiment may comprise carrying out the calibrating using a set of printing conditions expected in a standard printing operation.

In an embodiment, the conditions include at least one member of the group of conditions consisting of: temperature of printing heads, voltage used on an ink jet producing piezoelectric, platen rotation speed.

In an embodiment, the indication is printed within an outer bound, from the calibration drop, of twice, or alternatively once, a field of view of an optical device monitoring the printing.

In an embodiment, the indication is printed within a distance of 2 mm or alternatively 1 mm, from the calibration drop.

In an embodiment, the indicator comprises an arrow for the first, arc, pattern, and rectangles for each of the second and third patterns.

The head calibration may use a sequence of non-equidistant nozzles.

The head calibration patterns may comprise between 29 and 39 drops for each one of a plurality of channels.

The method may comprise modifying the head pattern, and more particularly the arc and X-Y alignment patterns which rely on single nozzles, to avoid using non-operational nozzles.

The method may comprise finding the calibration ink drop using image processing, the image processing being set to exclude drops outside of a predetermined maximum-minimum size boundary.

The method may comprise using image processing to determine a position of a detected calibration drop to within 0.01 mm.

The method may comprise printing an indicator near a drop to be detected of the calibration pattern, to point out a location of the pattern.

According to a third aspect of the present invention there is provided a print head apparatus for additive manufacturing comprising:

a print head with nozzles;
a wiper that wipes across the nozzles on the print head; and
a shaped cam track to guide the wiper over the print head.

In an embodiment, the wiper is tensioned towards the printing head by a leaf spring.

In an embodiment, the wiper is attached to a crossbar, the crossbar riding on the shaped cam to push against the tension to distance the wiper from the printing head at predefined locations.

In an embodiment, the crossbar comprises crossbar arms, the crossbar arms riding on the shaped cam and pushing on the crossbar.

In an embodiment, the shaped cam comprises a first convex shape at a leading end of the print head and a second convex surface at a trailing edge of the print head.

In an embodiment, the printing head has a nozzle region and a non-nozzle region, the predefined locations being in the non-nozzle region.

In an embodiment, the predefined locations comprise latching regions for attaching and detaching the printing head and edge regions, the edge regions and the latching regions being capable of causing damage to the wiper.

In an embodiment, the first and second convex shapes being located to push the wiper clear of edges and latches in the edge and latching regions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
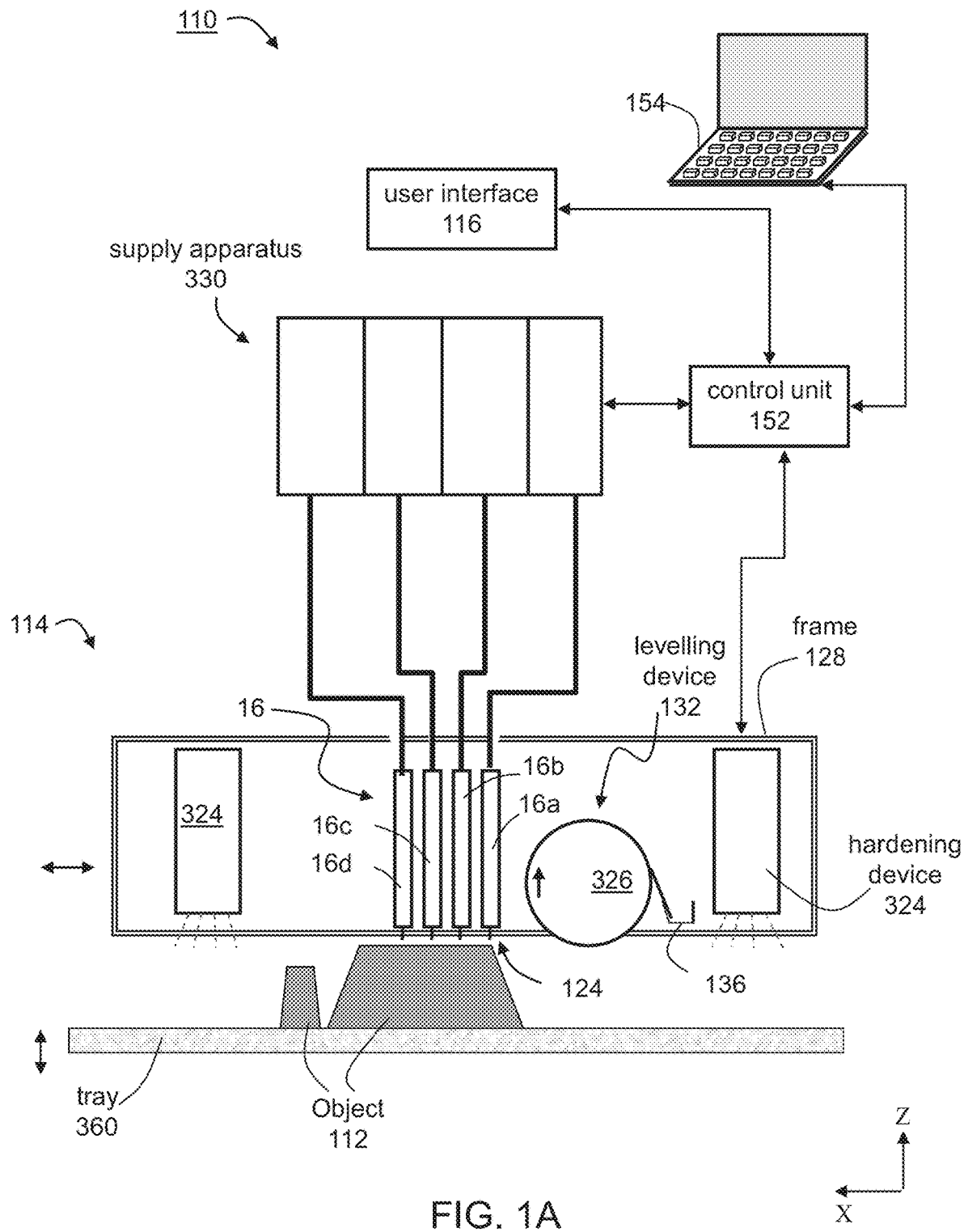
FIGS. 1A-D are schematic illustrations of an additive manufacturing system according to some embodiments of the invention.

The present invention, in some embodiments thereof, relates to accurate and unimpeded operation of print nozzles in additive manufacture and, more particularly, but not exclusively, to calibrating the nozzles and keeping them free of impediments to the ink jets.

A method of providing nozzle calibration parameters for a 3D printer comprises: printing an arc pattern, printing an X-Y align pattern, and printing a head calibration pattern, measuring actual positions of drops, calculating deviations of said measured actual positions from expected positions, and calculating calibration parameters to correct for the deviations. Indicator drops may be used to allow built-in image recognition to find the calibration drops.

In addition a cam system is provided to guide nozzle wipers.

More generally, wiper blades are pushed down by a crossbar which contacts features, specifically features which may form a shaped cam, on the printblock assembly. The cam prevents the wiper blades from making contact with the printhead latches or the leading edge of the nozzle plate.

Once the blades clear the leading edge of the nozzle plate, the crossbar lifts up, allowing the wiper blades to engage the nozzle plate. The printblock continues to move along the wipers, cleaning the nozzle plate.

Once the nozzles have been cleared by the wiper, the crossbar is deflected by features on the printblock that allow the wiper blades to remain in contact with the nozzle plate until the wiper blades fully move past the trailing edge of the nozzle plate. This clears all waste resin from the nozzle plate, preventing buildup at the trailing edge.

When the printblock motion is reversed, the wiper blades are again pushed down by the crossbar which contacts features on the printblock.

Once the blades clear the edge of the nozzle plate in the reversed motion direction, the crossbar lifts up, allowing the wiper blades to engage the nozzle plate. The printblock continues to move along the wipers, cleaning the nozzle plate.

The present embodiments provide a passive system, with no motor required. A simple design only requires one additional molded part as well as a cam surface on the printblock. The full length of the nozzle plate may be wiped, preventing resin buildup at the ends of the nozzle plate.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different dispensing head of the AM. The materials are optionally and preferably deposited in layers during the same pass of the printing heads. The materials and combination of materials within the layer are selected according to the desired properties of the object.

Figure 2A:
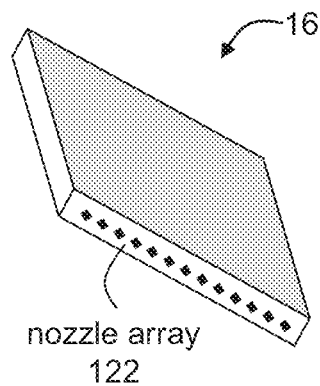
FIGS. 2A-C are schematic illustrations of printing heads according to some embodiments of the present invention.
Figure 2B:
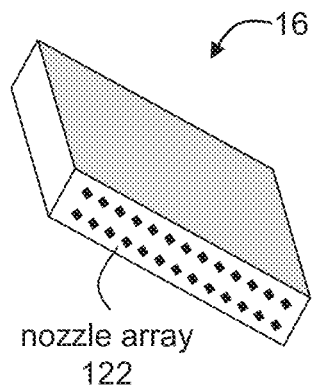
Figure 2C:
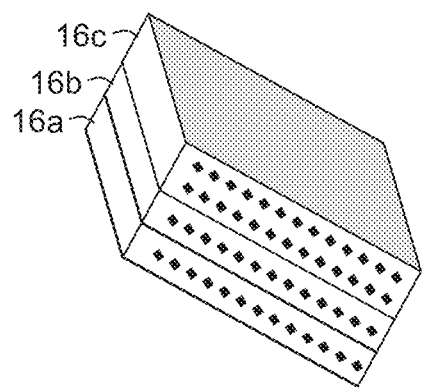

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material 124 is dispensed.

Preferably, but not obligatorily, apparatus 114 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein the term "about" refers to ±10%.

For example, for $\alpha=1$, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or the like that may cause the deposited material to hardened. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
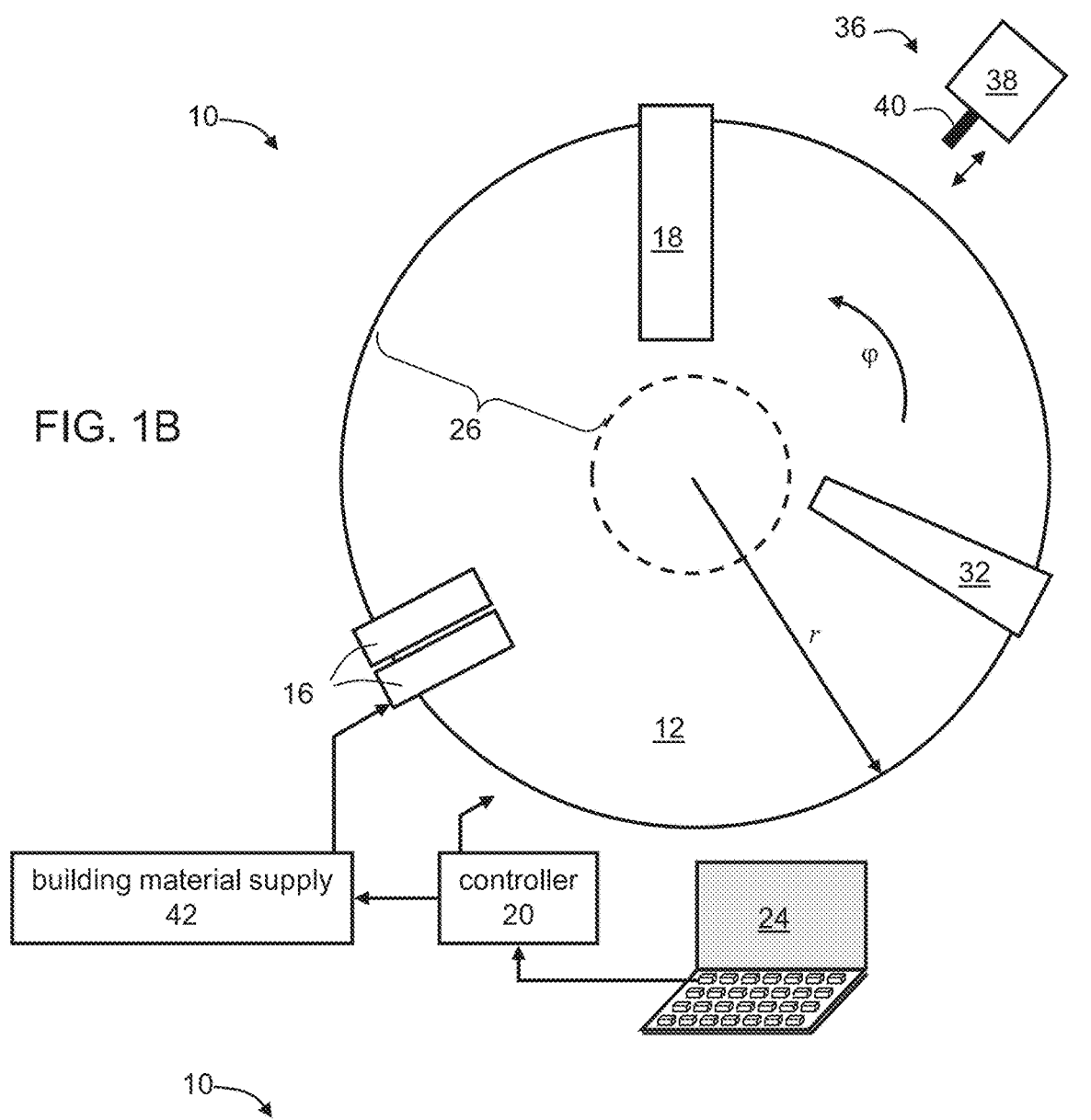
Figure 1C:
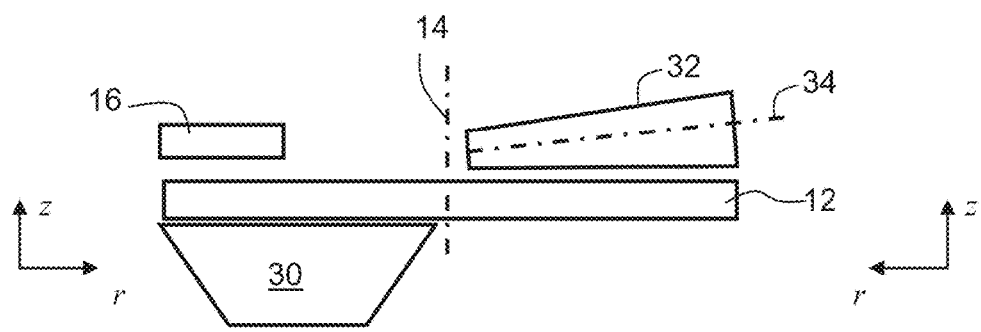
Figure 1D:
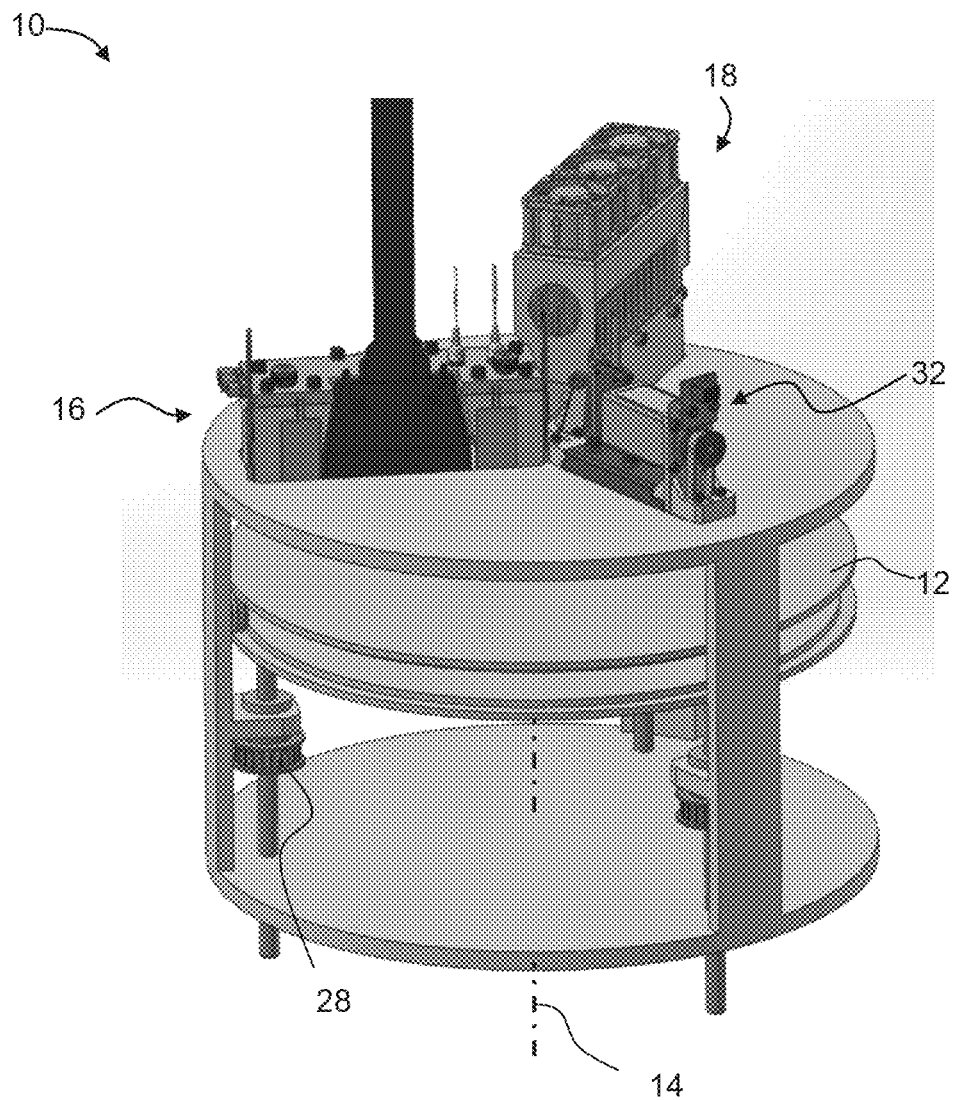

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersects the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
FIGS. 3A-F are schematic illustrations demonstrating coordinate transformations according to some embodiments of the present invention.
Figure 3B:
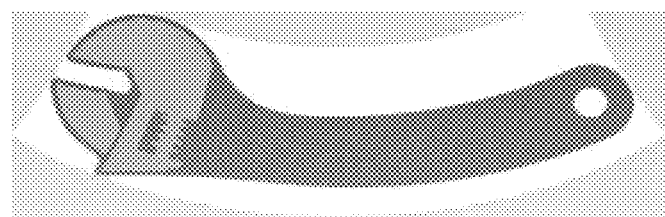
Figure 3C:
Figure 3D:
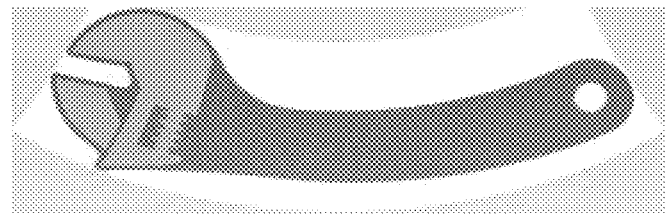
Figure 3E:
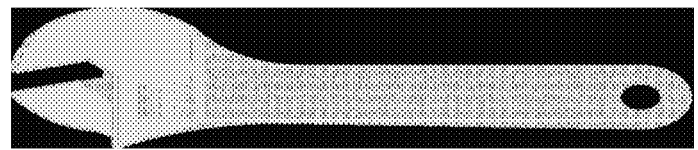
Figure 3F:
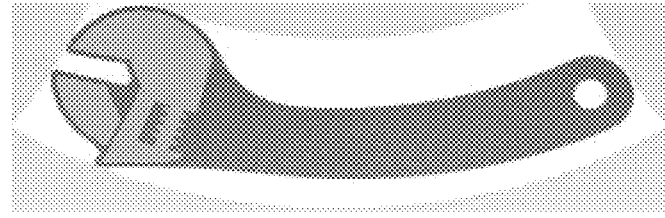

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-F, showing three slices of an object (each slice corresponds to fabrication instructions of a different layer of the objects), where FIGS. 3A, 3C and 3E illustrate slices in a Cartesian system of coordinates and FIGS. 3B, 3D and 3F illustrate the same slices following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Figure 4:
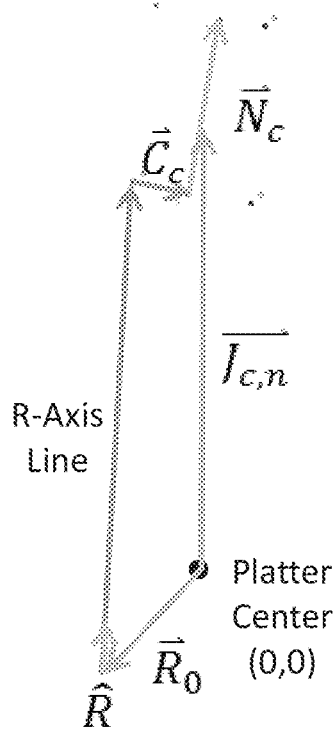
FIG. 4 is a vector diagram illustrating notation used for calculating the locations of ink drops.

Reference is made to FIG. 4, which shows the motion reference scheme in use. To calculate the radial location of any jet, j, on any channel, c, the following equation can be used:

$$\vec{J_{c,j}} = \vec{R_0} + |r|\hat{R} + \vec{C_c} + \frac{j}{(T_j - 1)}\vec{N_c} \quad [1]$$

Where r is the encoder location of the r-axis, and $T_j$ is the total number of jets per channel.

As the platter moves, each fire pulse will create a new vector $\vec{J_{c,j}}$ rotated about the origin at a spacing equal to the desired DPI on the outer edge of the print.

One can see the geometrical model described by equation [1] provides the full set of equations for the transformation $(x,y) \leftrightarrow r;\theta,j,$ where:
  x, y—the coordinates of the drop fired by the nozzle j of the channel (printing head) c
  r—radial motion of the printing block;
  Θ—angle of rotation of the platter
  j—the number of firing nozzle of the channel (printing head) c We assume the radial motion of the printing block is performed along ideally straight line parallel to the Y-axis.

It is possible to determine the calibration parameters from the position of the printed drops only and do not use any other geometrical measurements. With this concept the vectors Ro and Co cannot be determined separately, only their sum $\vec{R}_0 + \vec{C}_c$ appears in the equation [1]. In other words, the position of the drop fired by the virtual nozzle (#0) of the reference head at the zero radial motion corresponds to the zero position of the printing block.

Figure 5:
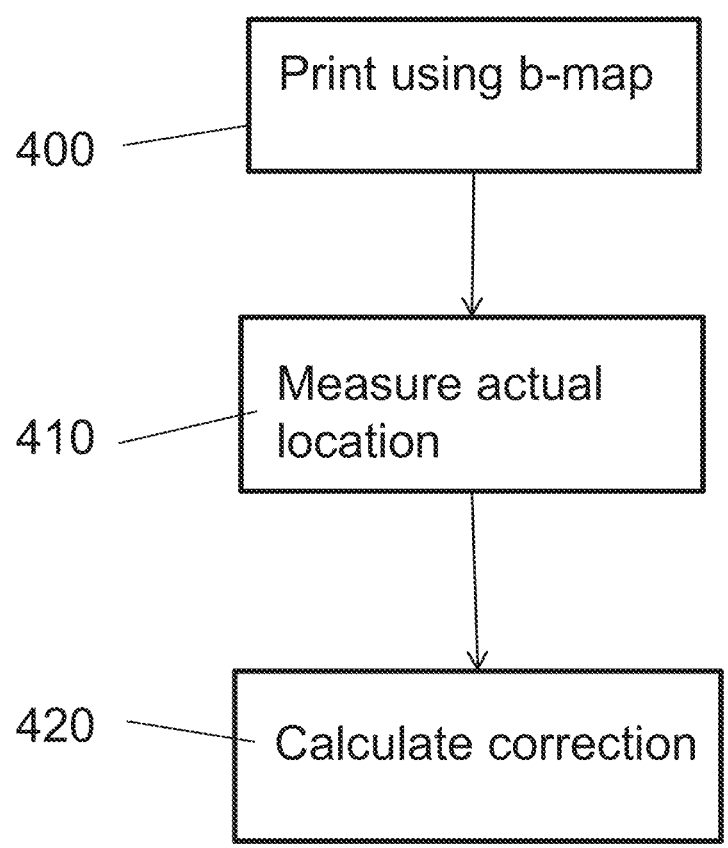
FIG. 5 is a simplified diagram of a calibration process for 3D printing according to an embodiment of the present invention.

With reference to the flow chart of FIG. 5, determination of the calibration parameters generally consists of:
- 400—Printing drops using known bitmaps (that specify printing locations). Drops are printed at the known location, as defined by the radial position of the printing block and angle of rotation of the platter. These form the intended locations, where the machine was trying to print.
- 410—Measurements of the actual positions of the printed drops. This is a measurement of the actual drop as produced.
- 420—Calculation of the calibration parameters from the known values (positions of the printed pixels at the bitmaps and the radial positions of the printing block) and the measured positions of the printed drops. That is to say the calibration is the difference between the intended and actual locations of the print drops.

Figure 6:
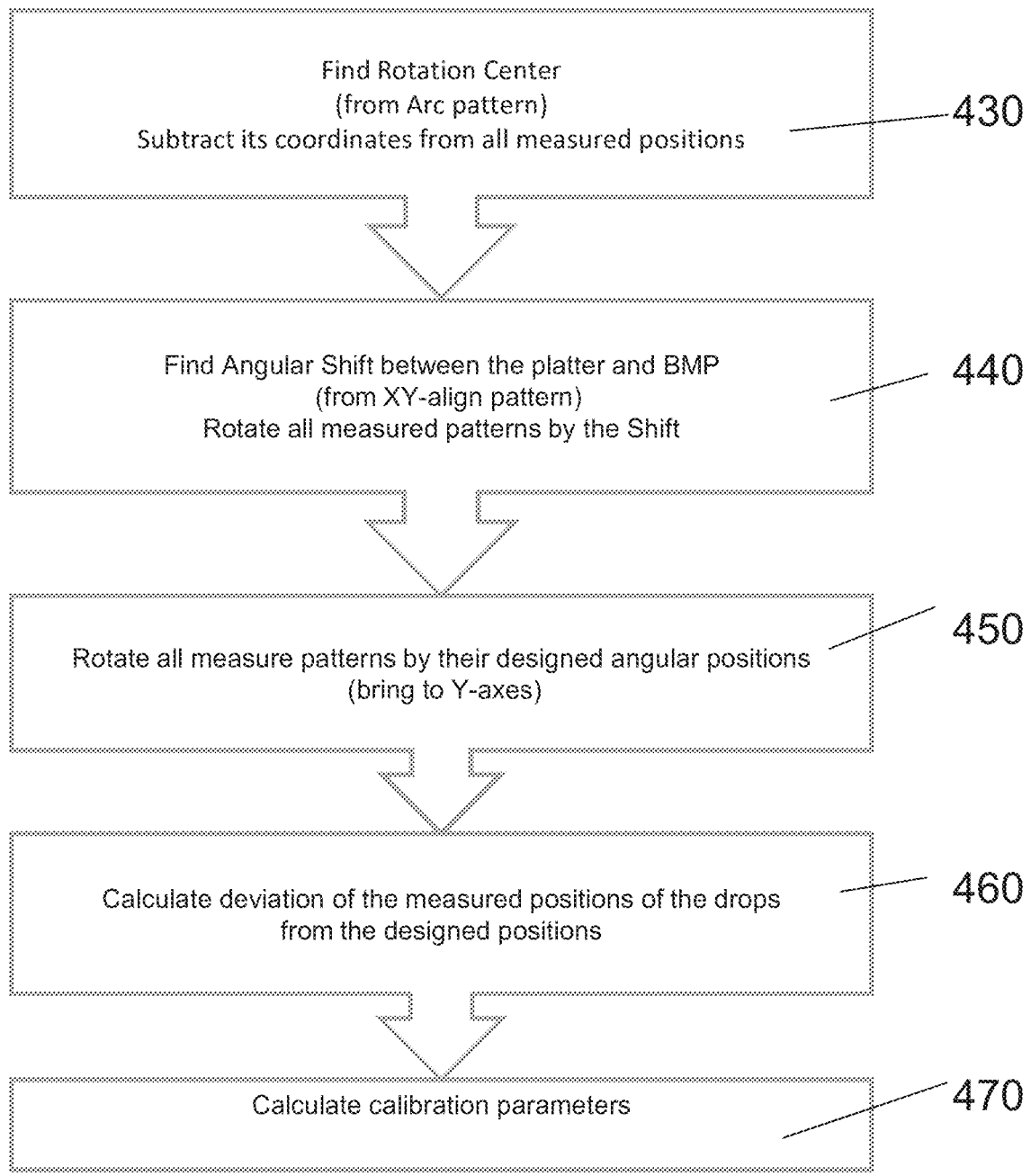
FIG. 6 is a simplified flow chart illustrating a process for calibration according to an embodiment of the present invention.

Reference is now made to FIG. 6, which is a simplified flow chart illustrating the calibration procedure in greater detail. 430 indicates finding a rotation center from an arc pattern. The arc pattern is discussed in greater detail hereinbelow. The coordinates of the arc pattern may then be subtracted from all measured positions.

In 440 an angular shift is obtained from an X-Y align pattern, again discussed below. All measured patterns are rotated by the shift.

In 450 all measured patterns are rotated by their designed angular positions towards the Y axis.

In 460, deviations of the design positions from the actual measured positions of the ink drops are determined and in 470 the deviations are used to calculate calibration parameters.

Figure 7:
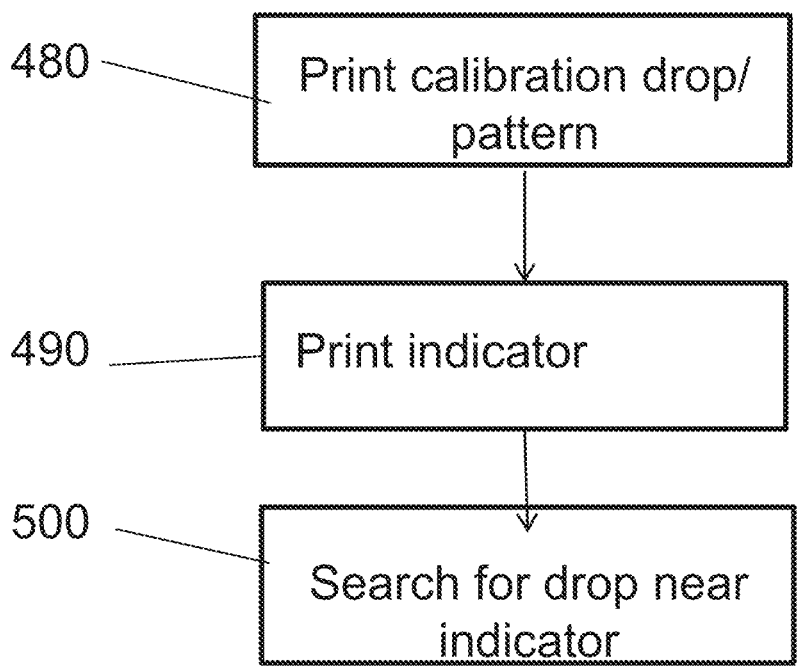
FIG. 7 is a simplified flow chart illustrating a process for calibration according to an embodiment of the present invention.
Figure 8A:
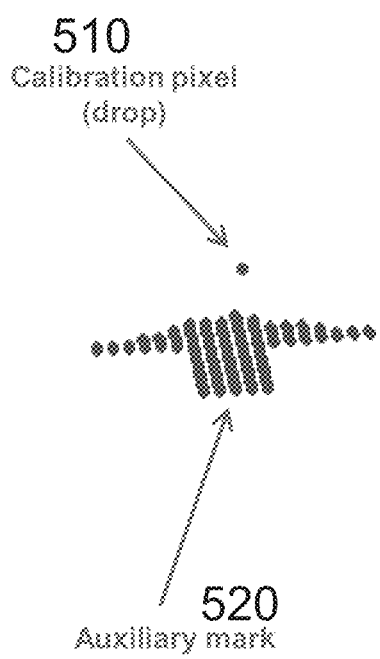
FIGS. 8A and 8B are a simplified diagram and a photograph respectively of a calibration drop and an indicator, according to an embodiment of the present invention.
Figure 8B:
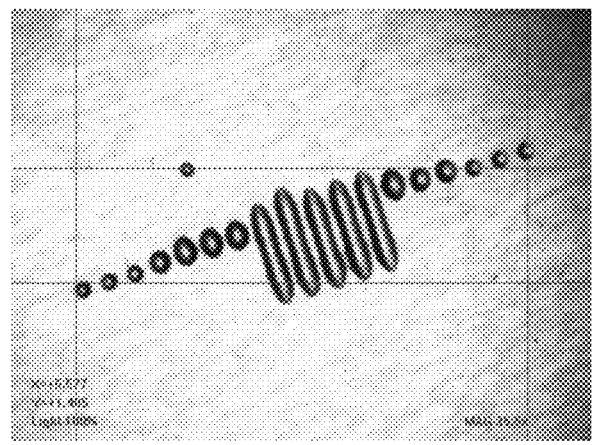

Reference is now made to FIG. 7, which is a simplified flow diagram illustrating an additional or alternative feature of the present embodiments. In FIG. 7 the calibration drop or pattern is printed, but it needs to be found by the image processing system in order to be measured. In order to reduce the search area, a pointer or indicator is printed 490 alongside the calibration drop, and then the image processing knows 500 where to look for the drop. FIG. 8A shows a schematic of a calibration drop 510 alongside an indicator or auxiliary mark 520, here in the form of an arrow. FIG. 8B is a photograph of the same in an implementation.

Figures 9A, 9B:
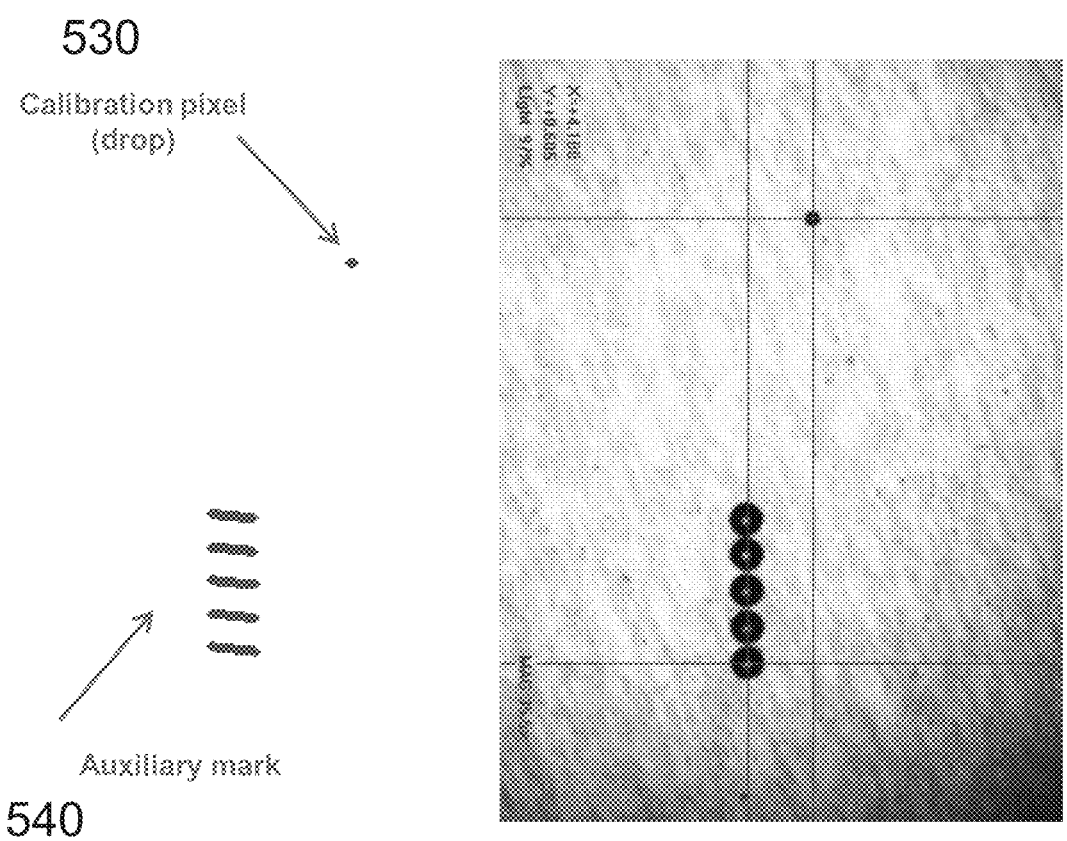
FIGS. 9A and 9B are a simplified diagram and a photograph respectively of a calibration drop and an alternative indicator, according to an embodiment of the present invention.

FIG. 9A shows a schematic of a calibration drop 530 alongside an indicator or auxiliary mark 540, here in the form of a rectangle. FIG. 9B is a photograph of the same in an implementation. It will be appreciated that different shapes can be used as the indicators as long as they are sufficiently definitive to be distinguished from random drops and dirt that may be encountered by the imaging system.

Printing the calibration bitmaps may be carried using expected or likely printing conditions. That is to say the same printing conditions or parameters expected in actual printing operations may be used in the calibration. Such parameters may include temperature of the printing heads and the voltage applied to the piezo, platter rotation speed etc.

Printing is generally carried out using bitmaps indicating where printed voxels are supposed to go. Calibration may also use bitmaps, and the calibration bitmaps may include calibration patterns that are explained hereinbelow.

Once printed, the positions of the drops are measured using a reference frame provided with a printed transparency, or may be measured using an appropriate measuring device.

Several sets of drops are printed for determination of different calibration parameters. A constant order may be kept for printing, measurement and processing the data.

Calibration 1. A first pattern is produced by firing drops with the same nozzle of the certain printing head at several rotation angles of the platter and a single radial position of the printing block. The drops may be expected to belong to a circular arc whose center determines the position of the platter rotation center.

Calibration 2. A second pattern is produced by firing drops with the same nozzle of the reference printing head at same rotation angle of the platter, at different radial positions of the printing block. The drops may be expected to belong to a same radial line whose position with respect to the found platter rotation center determines the $\vec{R}$ vector.

Calibration 3. A third pattern may be obtained by firing drops from several nozzles of each of the printing heads at the same rotation angle of the platter and a single radial position of the printing block. The drops (of each one of several channels) are expected to belong to the straight segment determined by the head's position and direction ($\vec{C}_c, \vec{N}_c$ vectors).

The configurations of the pixels corresponding to the fired drops at the each step are referred below as the "calibration patterns".

The first pattern is an Arc-pattern. The second pattern is an XY-alignment pattern, and the third pattern is a head pattern. The patterns are described in greater detail below.

In an embodiment, the arrow indicator is used with the arc pattern and the rectangular indicator is used with the XY alignment and head patterns. However any other suitable assignment of indicator symbols may be made.

Figure 10A:
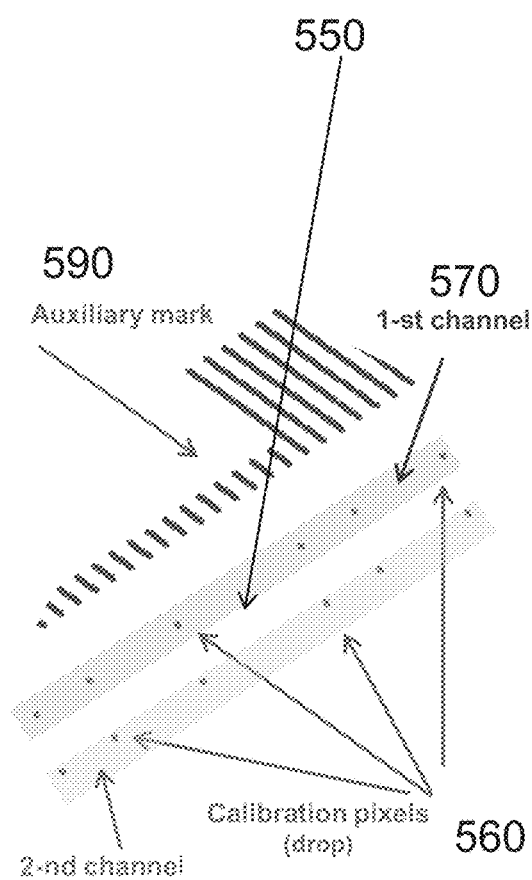
FIGS. 10A and 10B are a simplified diagram and a photograph respectively of a calibration head pattern and an indicator, according to an embodiment of the present invention.
Figure 10B:
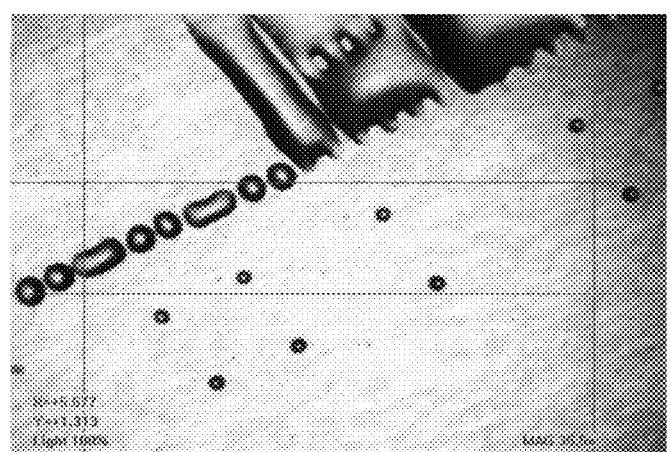

Reference is now made to FIG. 10A, which shows a schematic of a calibration pattern 550 comprising multiple drops 560 in two channels 570 and 580. The pattern appears alongside an indicator or auxiliary mark 590, here in the form of an extended arrow. FIG. 10B is a photograph of the same in an implementation.

As explained, the indications are provided in order to enable the image processing to find the calibration drops. Thus in an embodiment, the indicators may be printed within an outer bound from said calibration drop, of twice a field of view of the optical device monitoring the printing and which optical device is the basis of the image processing being used. Thus the field of view of the optical device may say be 1 mm, in which case the outer bound for the indicator would be 2 mm.

Alternatively, the indication may be printed within a preset distance of say 1 mm or 2 mm from the calibration drop. The use of a fixed distance is useful for example if at the time of programming it is not clear what physical optical device may be available.

The calibration may be carried out with different nozzles. Not all the nozzles need be used, and in an embodiment, a non-equidistant sequence of nozzles may be used for the head pattern, as will be discussed in greater detail hereinbelow. Typical head patterns used in current implementations make use of between 29 and 39 drops for each of the channels, as will be discussed in greater detail below.

Despite best efforts, certain nozzles fail during the lifetime of a device. The calibration patterns, particularly the arc and X-Y alignment patterns which just use a single nozzle, may be modified to avoid using non-operational nozzles, since in any event, not all nozzles need be used.

Figure 11A:
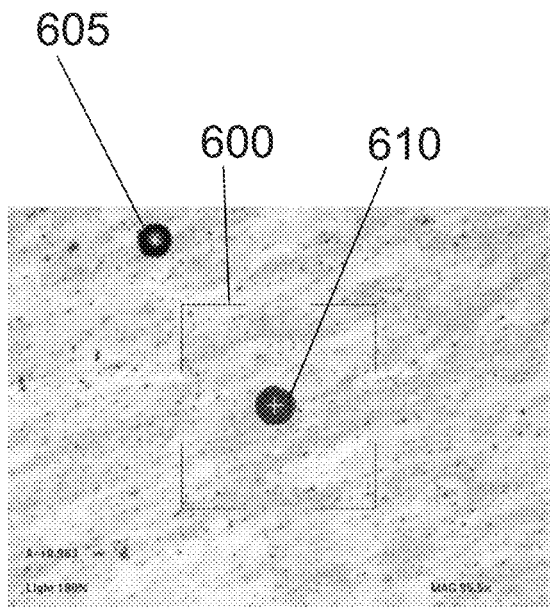
FIGS. 11A, 11B and 11C are photographs showing identification of calibration drops according to an embodiment of the present invention.
Figure 11B:
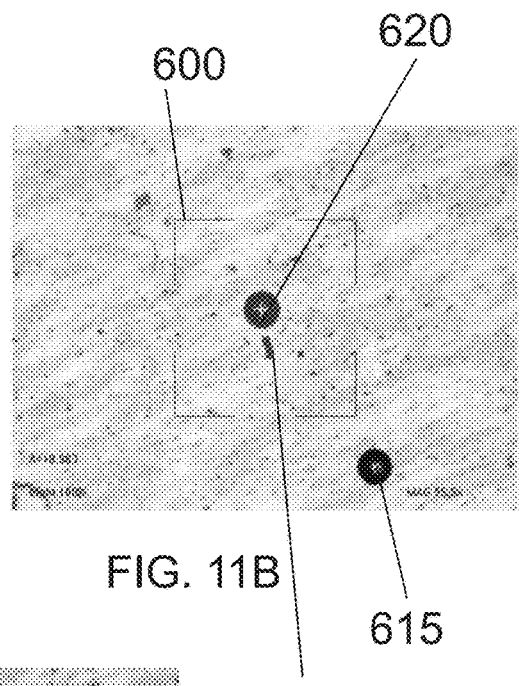
Figure 11C:
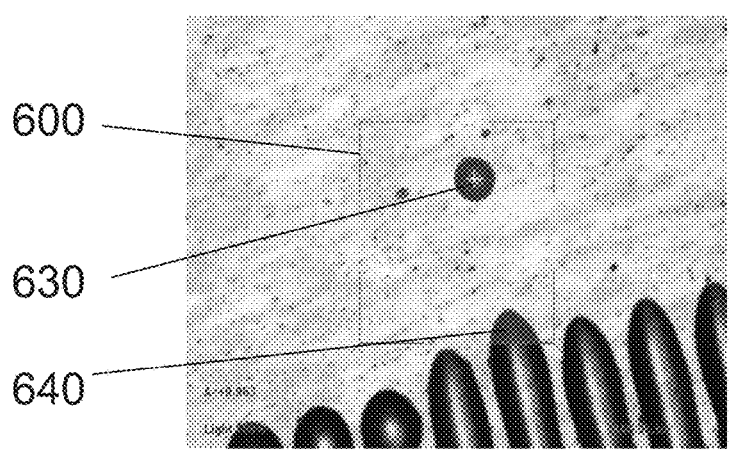

Reference is now made to FIGS. 11A, 11B and 11C, which are photographs showing the image processing detecting the calibration drop within the image. First of all a region is defined in which the mark is expected—see rectangle 600. Then, the mark being of the correct shape and size within the rectangle is selected. In FIGS. 11A and 11B, marks 610 and 620 are unambiguously selected. Marks 605 and 615 are rejected as being outside the expected area. Mark 625 is rejected for being too small and not of the expected shape. In FIG. 11C, both marks 630 and 640 appear to be the correct size, but mark 630 is correctly selected, both because it is more clearly within the expected area and because it has the correct shape of a drop.

The image processing may determine a position of a detected calibration drop to within 0.01 mm.

Calibration Patterns

The calibration patterns are now considered in greater detail. Each calibration pattern is described with the following parameters:

nominal angular position(s) (may be measured in degrees, radians or angular count clocks as the natural X-index of the bitmap);
nominal radius position(s) (measured in mm); and
set of fired nozzles (natural Y-index of the bitmap).

The calibration procedure may require several tens of pixels to be fired by every nozzle of every head. This solves the problem that the nozzles do not effectively fire well after extended non-firing. The calibration procedure requires firing appropriate drops for head calibration patterns.

The arc-pattern as discussed may use arrows, as the auxiliary marks, near each calibration drop. By contrast, the XY-alignment and head patterns may include small rectangles. The indicators or auxiliary marks are required as the single drop is too small for reliable recognition. In order to provide better recognition the indicators ensure four angularly adjacent drops for each calibration drop. Each angular count correspond to a linear step of 0.0045 mm or less, and the drops may have a diameter of at least 0.08 mm so as to merge to result in one large round drop. The head pattern includes drops fired by many nozzles, and thus jets, of the same head, the head being held at the same angular and radial position. The head pattern may be used for calculation of the position of the given nozzle, and may allow for detection missing or non-firing nozzles on the particular head. The head firing sequence is referred as the key sequence and is described in greater detail below.

Virtual Nozzle and Key Sequence

In order to provide the robust determination of the nozzle's position, the head pattern includes firing of non-equidistant drops. We may use the "2-4-6" sequence, that is to say a nozzle is fired, two are left unfired, then another nozzle is fired, and then four are left, another nozzle is fired, and then six are left blank and the sequence begins again. Such a sequence requires that nozzles #1, 3, 7, 13, 15, 19 etc. are fired. The distances between the first and second and the second and third actually fired drops depend on the presence of the missed nozzle(s). The sequence can be used in order to determine what nozzle has fired the first drop. For example the first drop may be fired by nozzle #3, if the first and second nozzles are missed.

The coordinate calculation may be based on the presumed location of a nozzle #0, a virtual location. The identity of the first firing nozzle may be required to calculate the coordinates of the expected drop from the virtual nozzle reliably.

The series of the non-equidistant drops for two channels are clearly seen in FIGS. 10A and 10B. Head patterns as used in the implementation photographed include between 29-39 drops for each channel, depending on the particular channel.

The XY-alignment and Arc pattern are printed using specific nozzles, as discussed. If the nozzles are clogged, and other nozzles have to be used, the corresponding changes may be made to the pattern data and bitmaps.

Measurement Process

Figure 12:
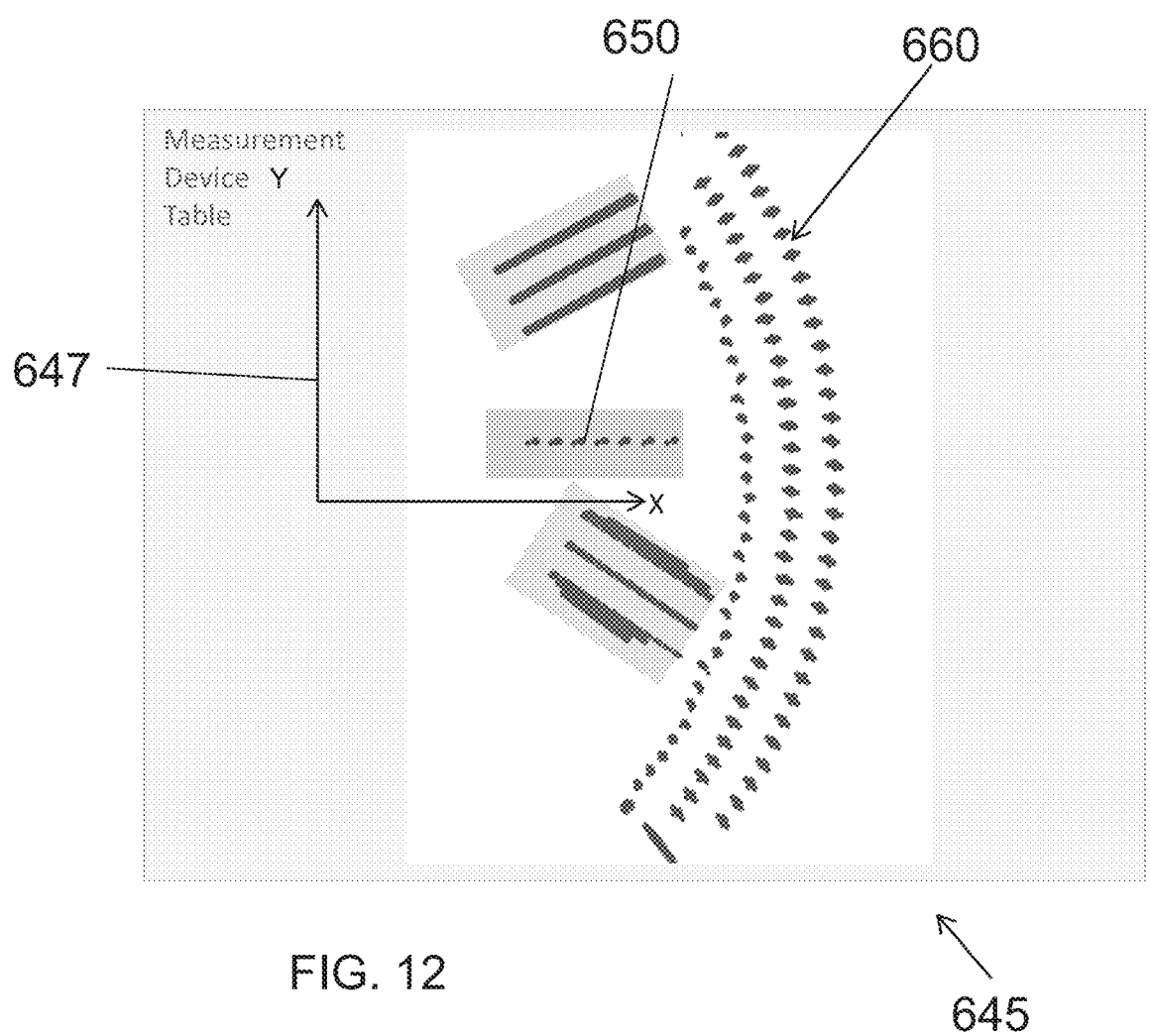
FIG. 12 is a simplified diagram showing alignment of arc, X-Y and head indicators against an axis for measurement of actual drop position according to an embodiment of the present invention.

Reference is now made to FIG. 12 which is a simplified schematic diagram showing alignment of the measurement device with a fixed axis where a measurement device is used. Measurement may be carried out using such a measurement device, the device having a table 645. It is recommended to use a printed calibration transparency having a measurement axis 647 and to place such a transparency on the measured device table 645 in such a way that the positive direction of the X-axis (of the measured device) is approximately aligned along the XY-alignment pattern 650 toward the arc patterns 660. The head patterns are shown at 655.

The positions of the printed drops may be measured with an accuracy of at least 0.01 mm, and many measurement devices have their own built-in image processing. If the device itself performs automatic image processing, so that it can do drop recognition and calculation of the drop center of gravity, then one has to pay special attention to setting the relevant parameters. One may use the device in centroid recognition mode, which recognizes a single gray level. FIGS. 11A, 11B and 11C show examples of recognition, as discussed above, and typical recognition artifacts are also shown. One method for excluding artifacts is to exclude coordinates of drops with unusual or unexpected size, shape or location.

An implementation was carried out using the measurement system "Sprint MVP 300" provided by RAM Optical Instrumentation.

The results of the measurements may conveniently be processed using a MATLAB based procedure and an example of a relevant fragment of a worksheet is given in Table 1.

TABLE 1

MATLAB Processing To Obtain Calibration
Patterns File:C:\U_AlexanderL\MATLAB\Tavor\GeomCalibration\
FullGeomCalibrTranspPatterns_Tavor_v2_A4_1437dpiTang.xlsx
Measurements Folder:C:\U_AlexanderL\MATLAB\Tavor\
GeomCalibration\MVP_24Feb15

| | | | | | | |
|---|---|---|---|---|---|---|
| FromCenterTo0x | −14.094 | | | | | |
| FromCenterTo0y | −1.124 | | | | | |
| From0ToNozzle0x | 0.000 | | | | | |
| From0ToNozzle0y | 0.000 | | | | | |
| head # | 1.000 | 2.000 | 3.000 | 4.000 | 5.000 | 6.000 |

TABLE 1-continued

MATLAB Processing To Obtain Calibration
Patterns File:C:\U_AlexanderL\MATLAB\Tavor\GeomCalibration\
FullGeomCalibrTranspPatterns_Tavor_v2_A4_1437dpiTang.xlsx
Measurements Folder:C:\U_AlexanderL\MATLAB\Tavor\
GeomCalibration\MVP_24Feb15

| | | | | | | |
|---|---|---|---|---|---|---|
| XLocation | 0.000 | 0.980 | 13.496 | 14.496 | 27.021 | 28.029 |
| YLocation | 0.000 | 0.159 | −0.136 | 0.032 | −0.243 | −0.074 |
| Direction | −0.0089 | −0.0090 | −0.0094 | −0.0094 | −0.0095 | −0.0093 |

The MATLAB application may read measured positions of the calibration drops. Separate files may include different calibration data from the different patterns, thus:
 a file with data for the Arc-pattern;
 a file with data for the XY-alignment; and
 six files with data for the different printing heads (assuming six printing heads).

Values may be used to define reasonable drop size so as to exclude noisy or misrecognized fragments. Thus, a parameter ValidDropSize (min, max) may be set depending on the optical system and magnification in use.

Table 2 below indicates typical values for attempted detection of six drops numbered from 1 to 6. Drop #3 relates to a drop that was not found in the expected location.

TABLE 2

Typical Data for Drop Detection - Location and Size of Drop

| Step Feature | X/R Location | Y/A Location | Z Location | Size Reference |
|---|---|---|---|---|
| 1 Centroid | +0.859 | +41.309 | −0.001 | +0.027 |
| 2 Centroid | +1.777 | +41.766 | −0.001 | +0.024 |
| 3 Centroid | N/A | N/A | N/A | N/A |
| 4 Centroid | +5.441 | +43.484 | −0.001 | +0.025 |
| 5 Centroid | +6.382 | +43.933 | −0.001 | +0.026 |
| 6 Centroid | +7.906 | +44.644 | −0.001 | +0.026 |

Figure 13A:
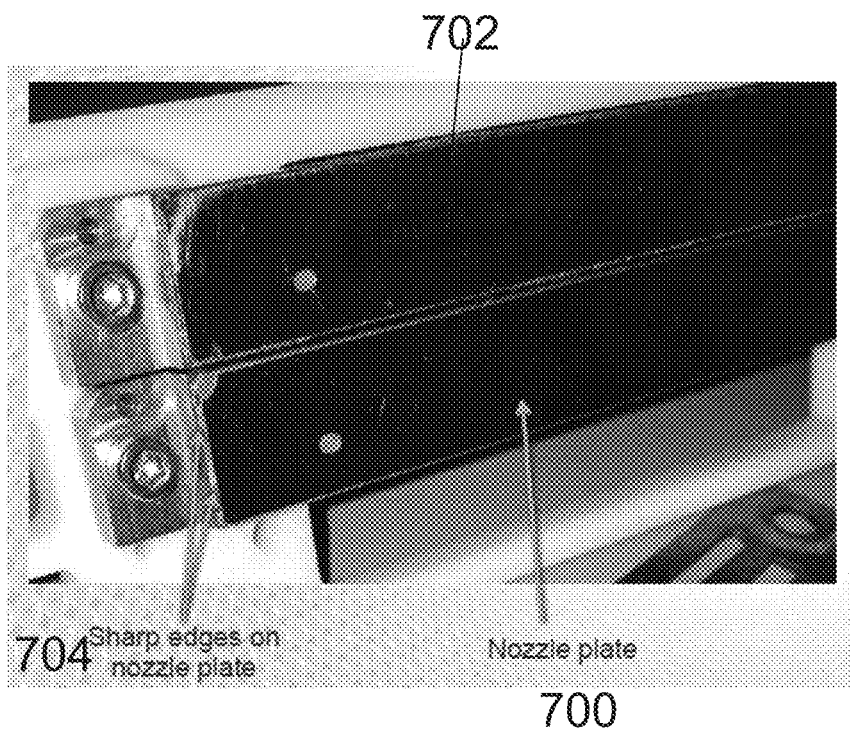
FIG. 13A is a photograph illustrating nozzle plates and sharp edges on a 3D printer.
Figure 13B:
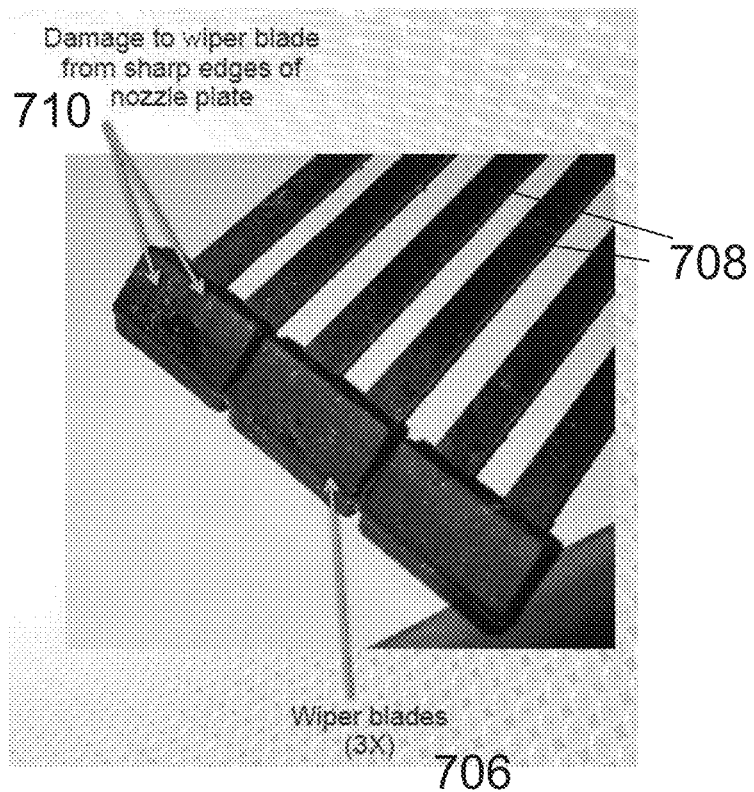
FIG. 13B is a photograph showing damage caused to the wiper blades by the construction of FIG. 12.

Reference is now made to FIG. 13A, which illustrates part of a printing head for a 3D printer or additive manufacturing apparatus. The printing head includes nozzle plates 700 and 702, which are characterized by sharp edges 704. The nozzle plates are cleaned by wipers, and FIG. 13B shows wiper blades 706 for wiping across nozzle plates. The wiper blades are each tensioned onto the plates by pairs of leaf springs 708. The wiper blades travel over sharp edges 704 and damage such as that shown at 710 may result.

Figure 14:
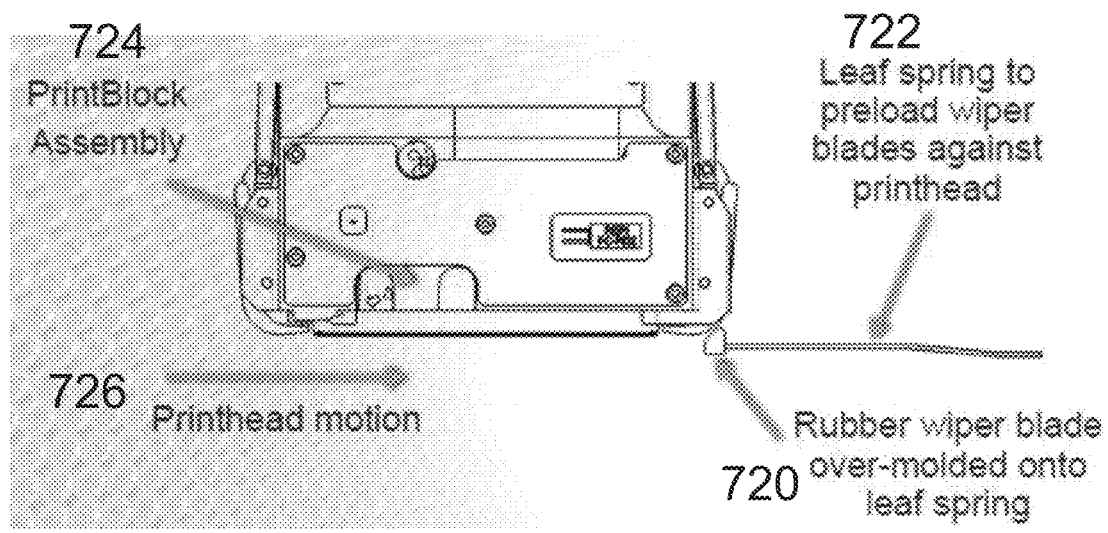
FIGS. 14, 15, 16 and 17 illustrate printhead motion and wiping with the construction of FIG. 12.

FIG. 14 illustrates wiper blade 720 pre-tensioned by leaf spring 722 and intended to wipe the nozzle plates of print head 724. Arrow 726 indicates the motion of the print block.

Figure 15:
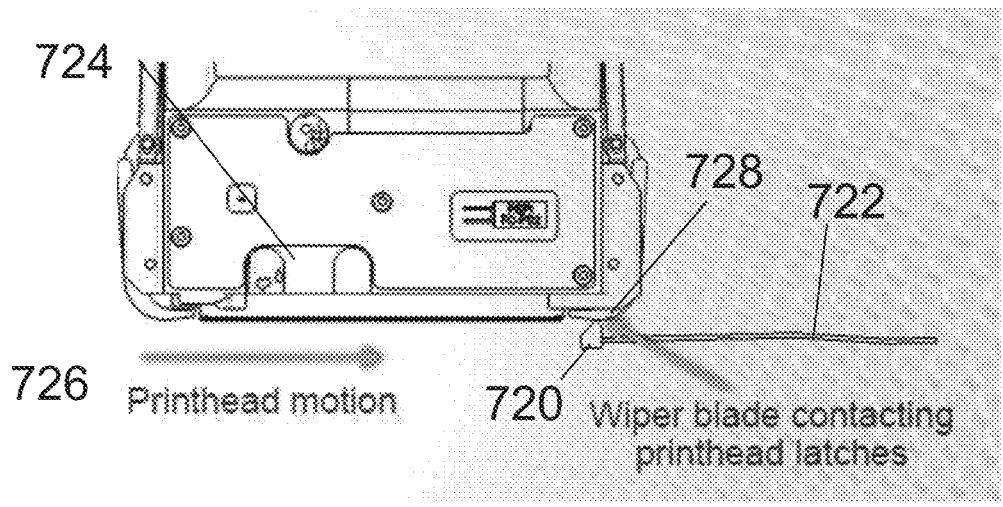

FIG. 15 shows the same construction a short time later and the wiper blade 720 catches against the printhead latches 728 which are intended to releasably hold the print head in position.

Figure 16:
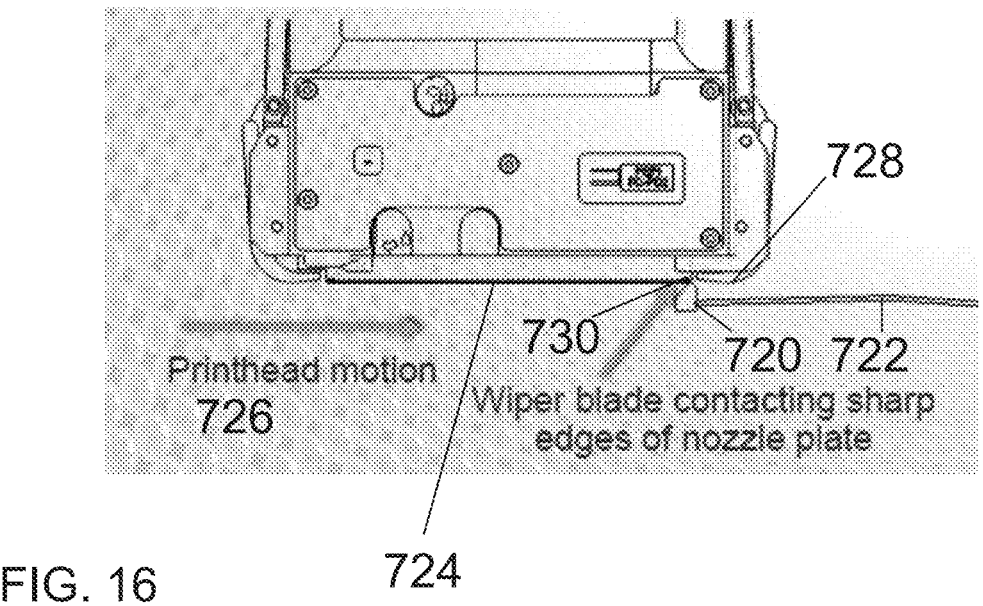

Reference is now made to FIG. 16, which illustrates the same construction a short time later still. Parts that are the same as in previous figures are given the same reference numerals and are not referred to again except for explanation of the current figure. This time wiper blade 720 is pressing against nozzle plate edge 730.

Figure 17:
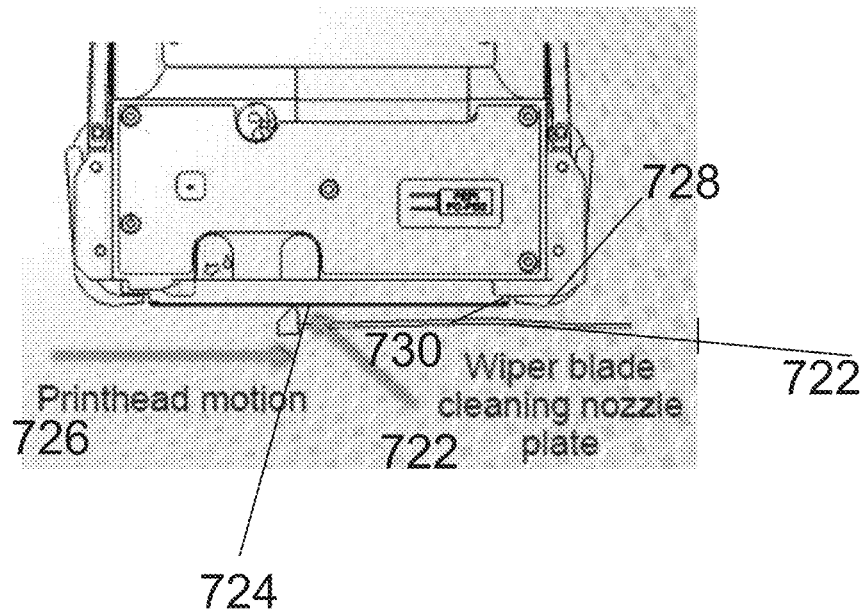

Reference is now made to FIG. 17, which illustrates the same construction a short time later still. Parts that are the same as in previous figures are given the same reference numerals and are not referred to again except for explanation of the current figure. This time wiper blade 720 is pressing against nozzle plate 724 during the wiping process.

Figure 18:
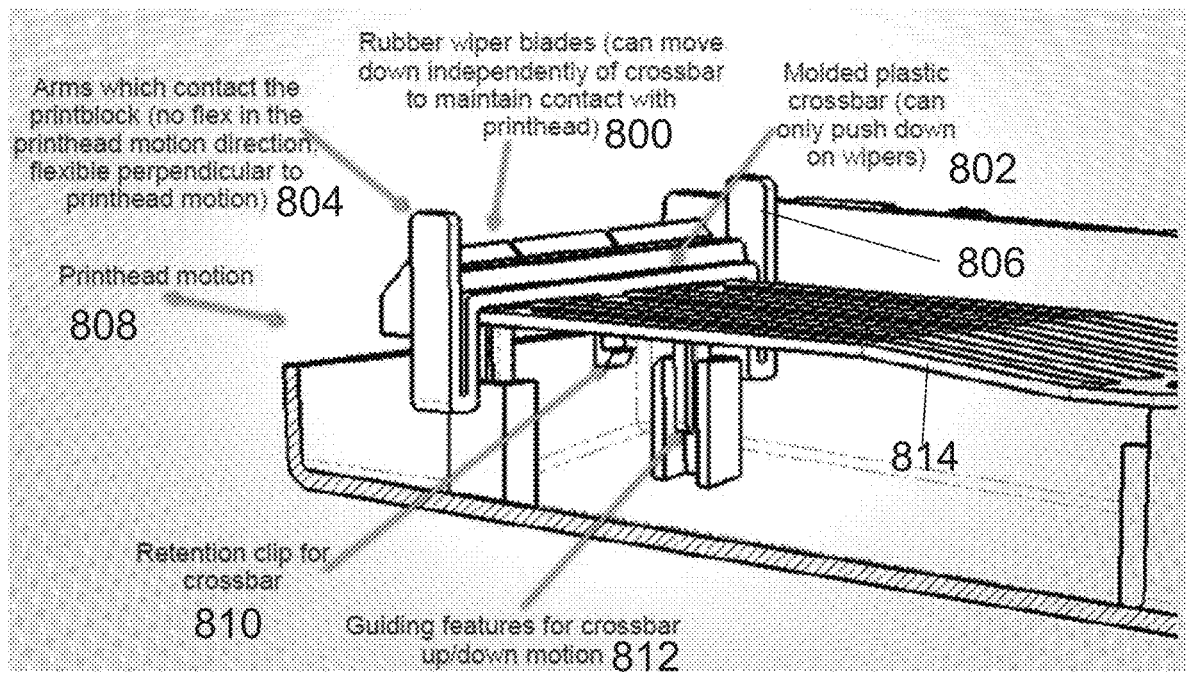
FIG. 18 is a simplified schematic diagram which illustrates a wiper constructed according to an embodiment of the present invention.

Reference is now made to FIG. 18 which illustrates a construction for a wiper according to the present embodiments for cleaning the printing head and nozzles of an additive manufacturing apparatus, otherwise known as a 3D printer.

Wiper blades 800 are mounted on a moulded plastic crossbar 802 which is able to push the wipers downwards—that is away from the surface of the printhead. The crossbar has side arms 804 and 806, which act as travel guides by directing the wipers along the sides of the print head. The arms are flexible in the direction perpendicular to the direction of travel of the printhead. The direction of travel of the printhead is indicated by arrow 808. 810 is a retention clip for the crossbar, and 812 is an additional guiding feature. The wipers are biased against the print head surface and the nozzle plates to be wiped, by leaf springs 814, so as to provide a wiper that wipes across nozzles on the printing head to clean the inkjet nozzles.

Figure 19:
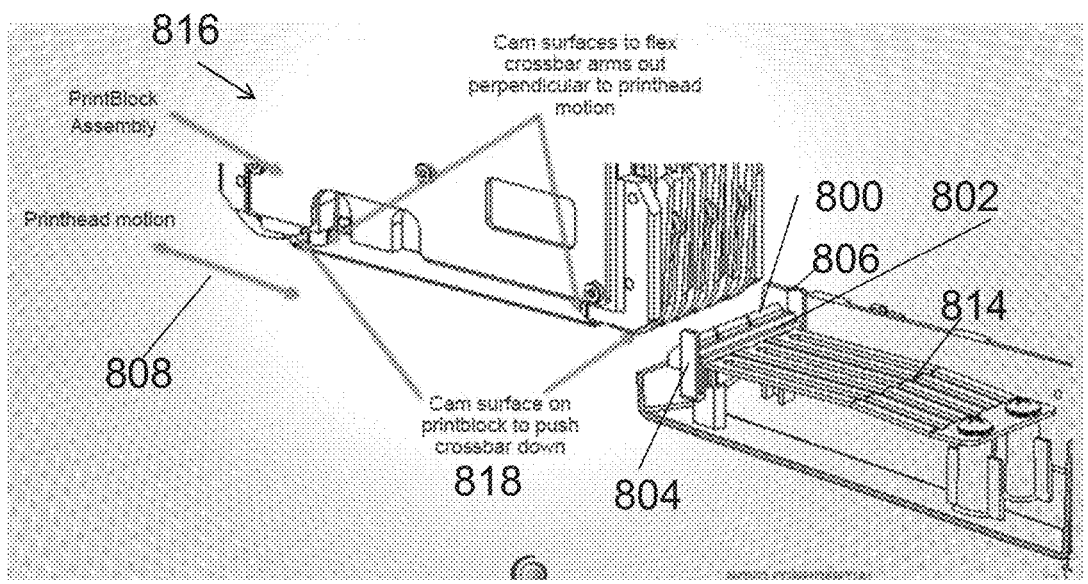
FIG. 19 is a simplified schematic diagram showing a print head with a cam surface according to an embodiment of the present invention.

Reference is now made to FIG. 19, which is a simplified diagram illustrating the wiper of FIG. 18 as print head 816 approaches. Parts that are the same as in the preceding figure are given the same reference numerals and are only described again as needed.

The edge of print head 816 includes a shaped cam surface or track 818 which guides the crossbar and thus the wiper to guide the wiper over the print head, and specifically to push the wiper downwards so that it does not contact the print head surface until it reaches the nozzle area within the nozzle plates, thus avoiding latches or other attachment means and any sharp edges. Specifically, the cam surfaces, which are provided at the front and the back of the print head, push downwardly on the crossbar arms 804 and 806, which pushes the crossbar 802 downwards against the tension of the leaf springs 814 and keeps the wipers away from the print head until the cam area has been passed.

Figures 20A, 20B:
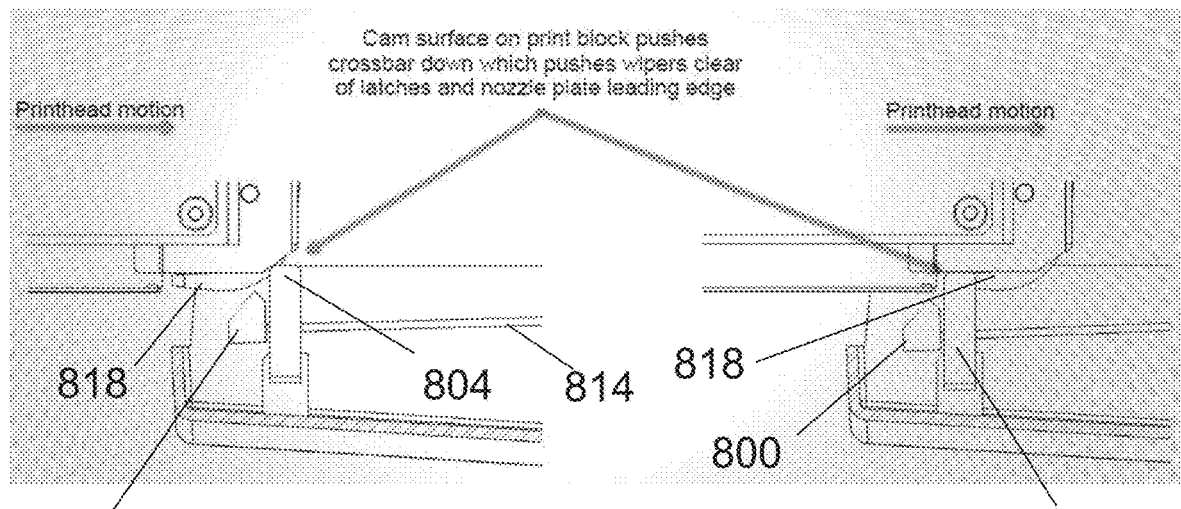
FIGS. 20A-D illustrate different stages in the travel of the wiper of FIG. 18 along the print head of FIG. 19.
Figure 20C:
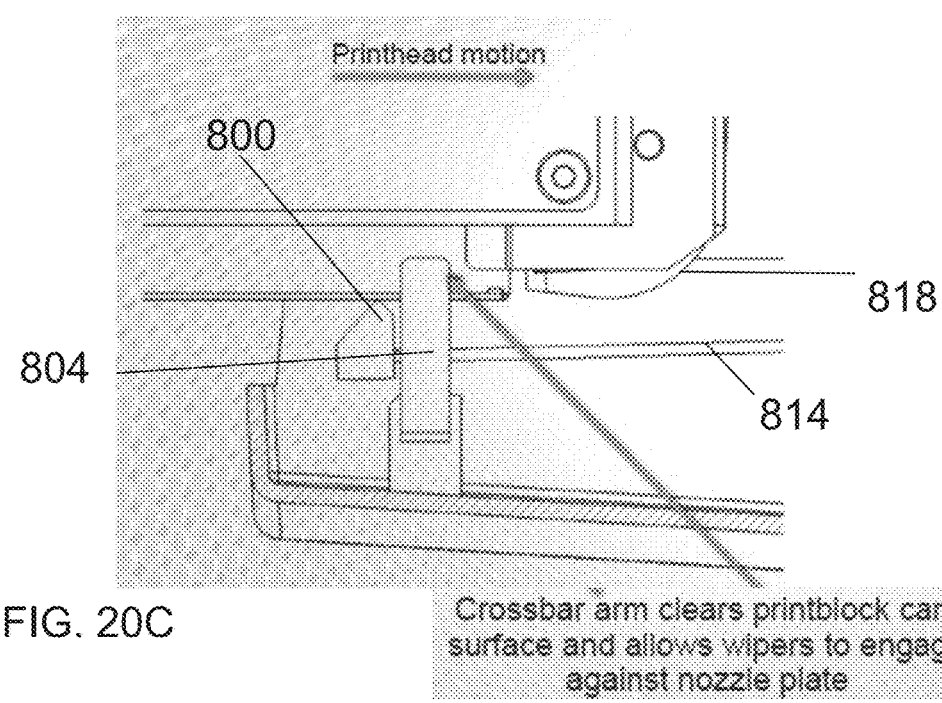
Figure 20D:
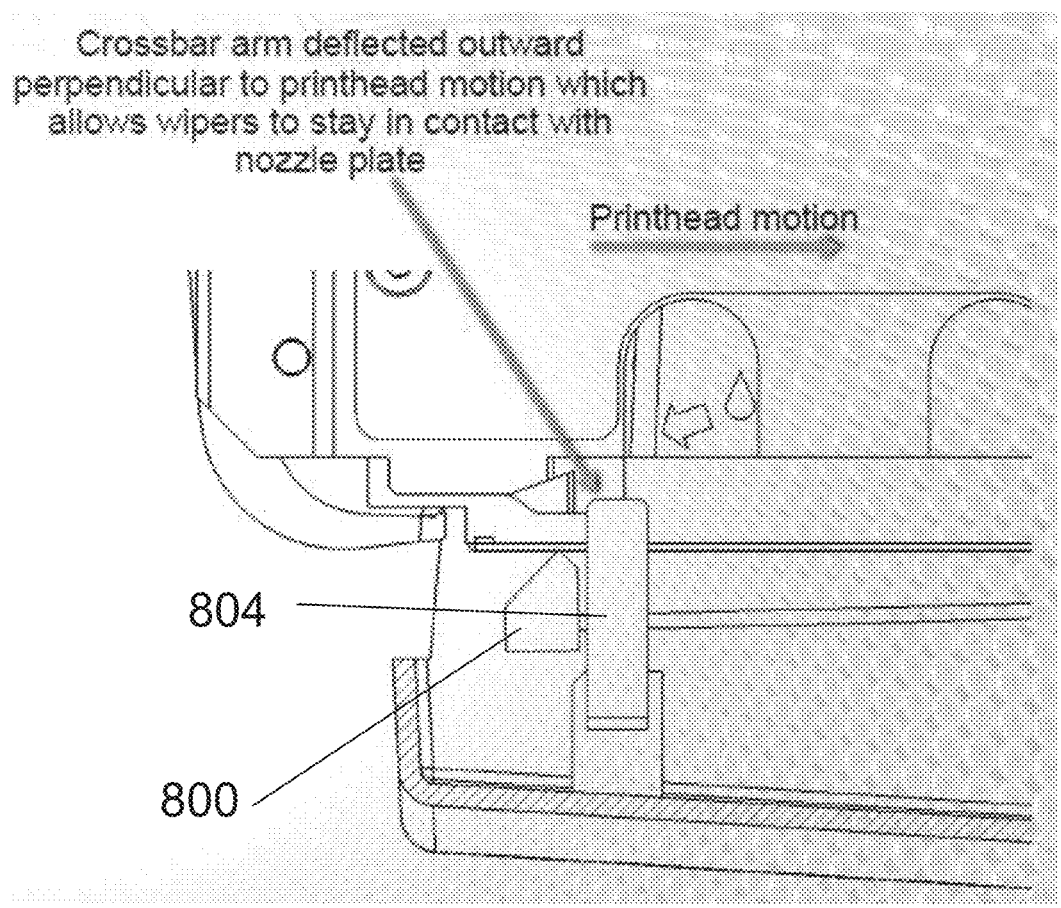

Reference is now made to FIGS. 20A, 20B, 20C and 20D which show four successive stages of the passage of crossbar arm 804 past cam surface 818. In FIG. 20A the cam surface starts to push down the crossbar arm 804. In FIG. 20B the cam surface pushes the crossbar arm 804 down sufficiently that the wipers clear the extent of the latches and any sharp edges. In FIG. 20C the crossbar arm clears the cam surface and the wipers engage the nozzle area. In FIG. 20D the crossbar arm 804 is pushed outwards perpendicular the printhead motion to allow the wipers to remain in contact with the nozzle surface. That is to say, once the nozzles have been cleared by the wiper, the crossbar is deflected by features on the printblock that allow the wiper blades to remain in contact with the nozzle plate until the wiper blades fully move past the trailing edge of the nozzle plate. This clears all waste resin from the nozzle plate, preventing buildup at the trailing edge.

Figure 21:
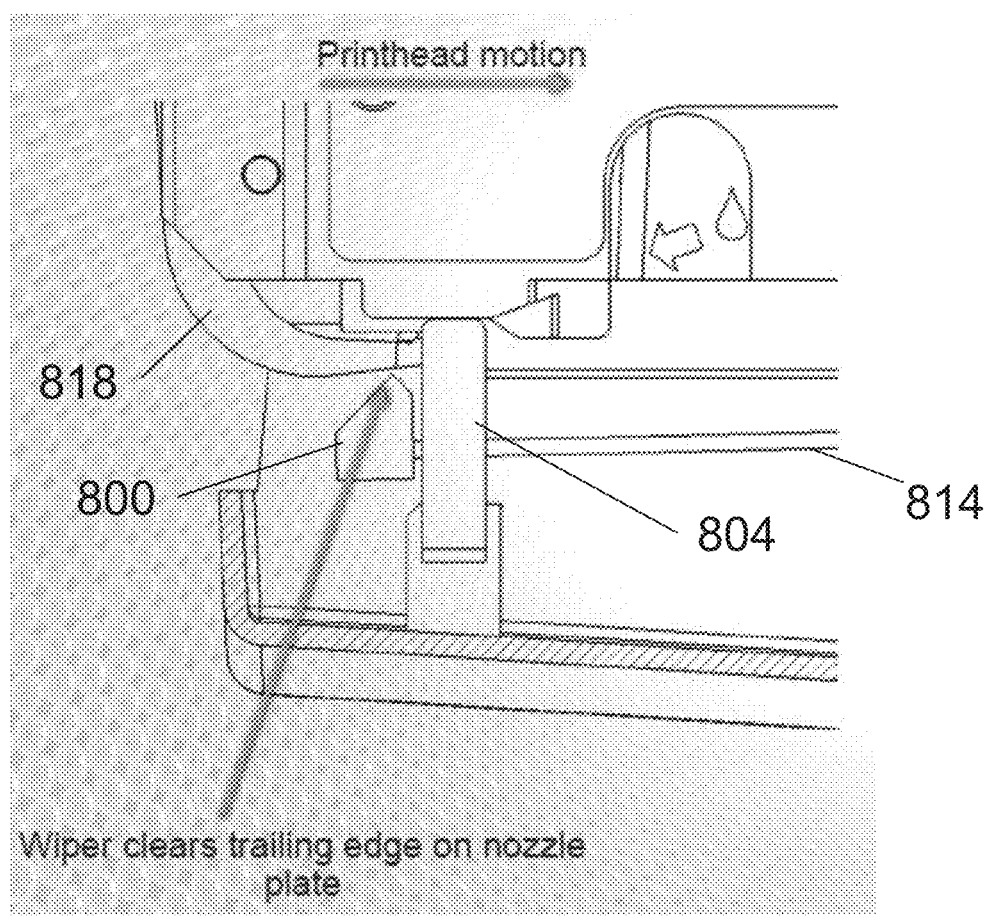
FIG. 21 is a simplified diagram illustrating the wiper of FIG. 18 having cleared the trailing edge of the nozzle plate of FIG. 19.

FIG. 21 shows the wiper having reached the far end of the print head. The cam surface 818 at the far end again pushes against the arms 804 and 806 so that the wipers 800 clear the sharp edges and latches at the far end of the print head.

Figure 22A:
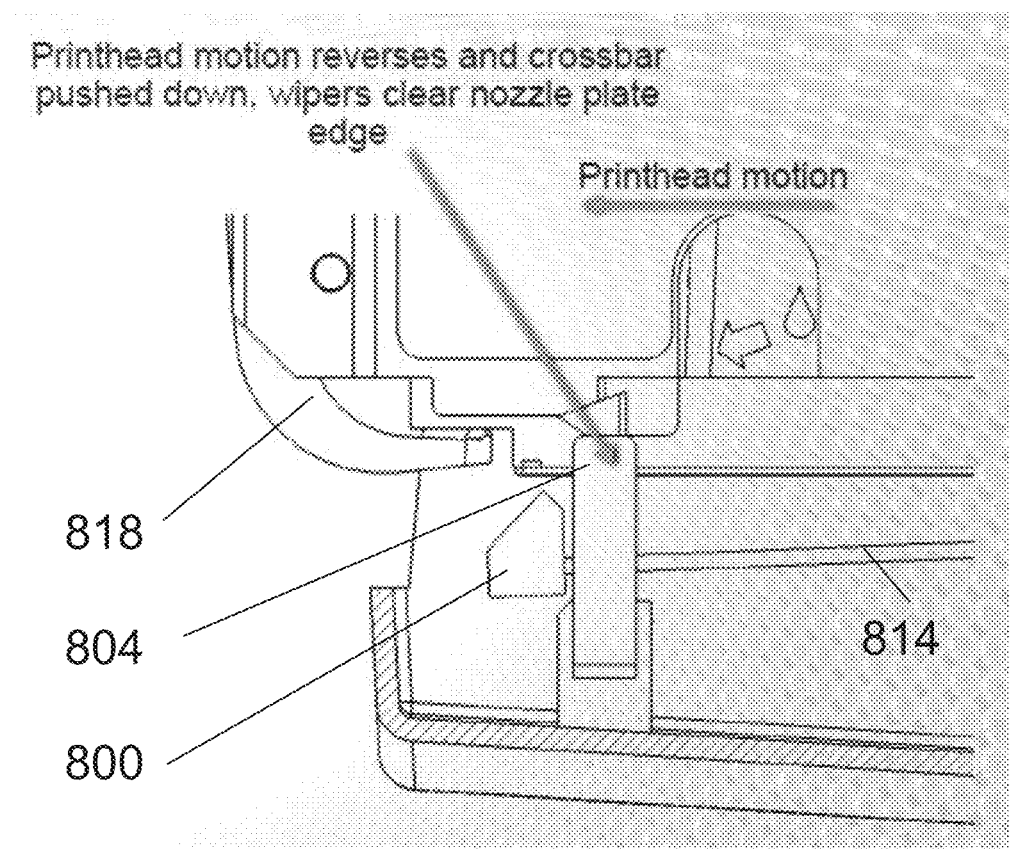
FIGS. 22A-C illustrate the wiper of FIG. 18 passing the print head of FIG. 19 in the reverse direction.
Figure 22B:
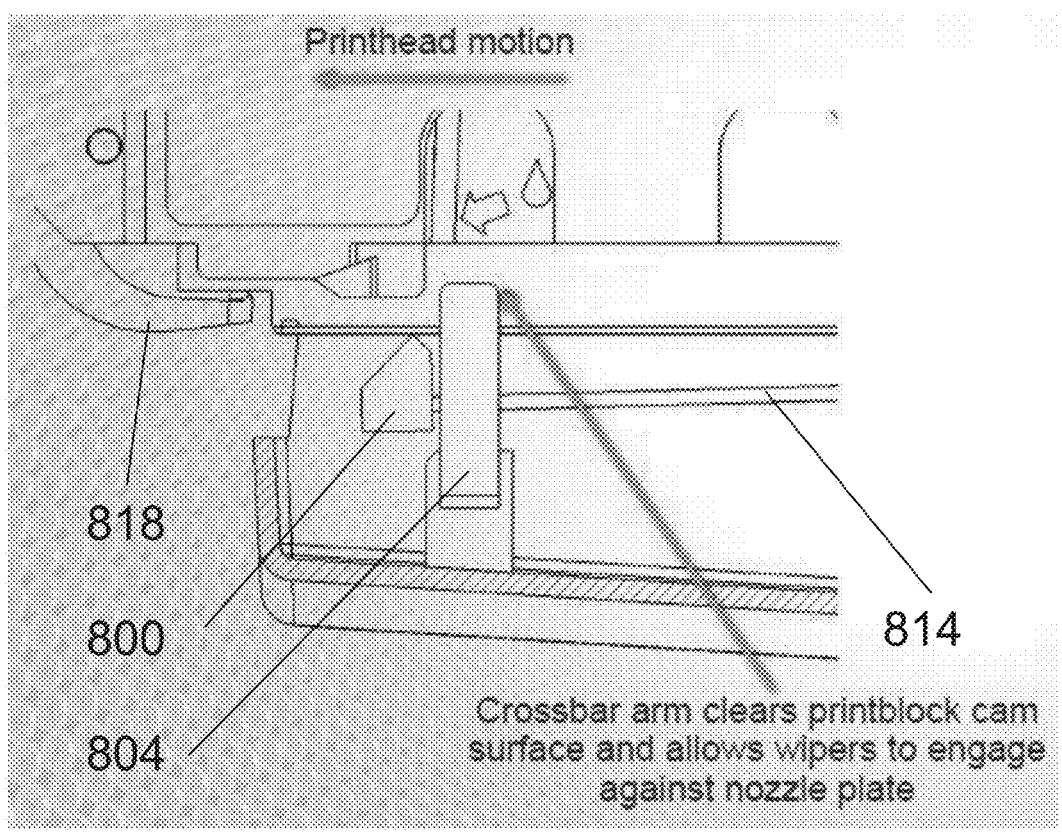
Figure 22C:
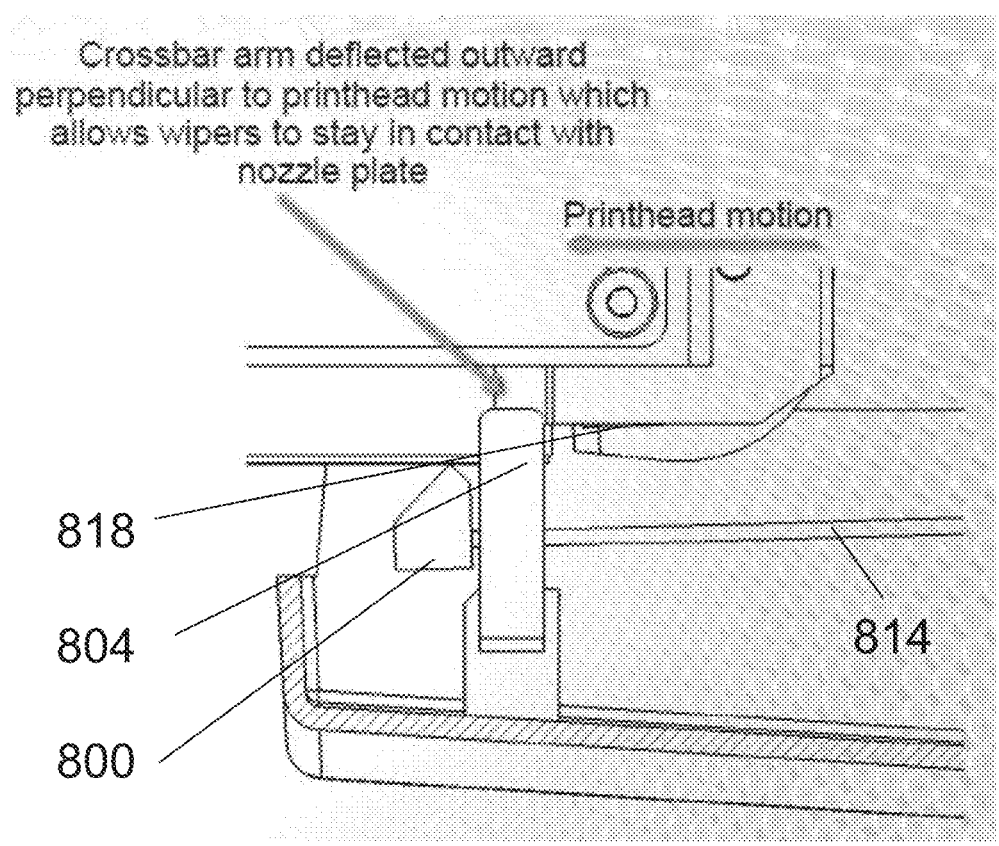

FIGS. 22A-C illustrate the print head traveling in the reverse direction. In FIG. 22A the printhead motion reverses and the crossbar arms are pushed down by the cam so that wipers clear the sharp edges once again. In FIG. 22B the crossbar arm 804 clears the cam surface 818 and the wipers engage the nozzle plate. In FIG. 22C the crossbar arm 804 is deflected outwards perpendicularly to the printhead motion and thus allows the wipers to stay in contact with the nozzle plate.

Thus the printing head has a nozzle region and a non-nozzle region, and the cam ensures that the wipers are pushed out of the way in the non-nozzle region and allowed to contact the nozzle plates in the nozzle region while being kept out of reach of the sharp edges and latches etc in the non-nozzle regions which may cause damage to the wipers and wiper blades.

The shaped cam 818 may be provided with a convex shape to push the wipers downwards and out of the way at the critical locations.

It is expected that during the life of a patent maturing from this application many relevant additive manufacturing technologies will be developed and the scope of the term "additive manufacture" is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for calibrating print heads of a 3D printer with a rotating printing platter, the method comprising:
    printing a first calibration pattern to form an arc pattern using one nozzle of a given printing head at a plurality of rotation angles of a rotating printing platter and a single radial position of a printing block;
    printing a second calibration pattern to form an X-Y alignment pattern using one nozzle of a printing head at a single rotation angle of said rotating printing platter, and moving between different radial positions of the printing block to print a plurality of drops expected to belong to a same radial line;
    printing a third calibration pattern to form a printing head pattern, said third calibration pattern being formed by printing drops from a plurality of nozzles of a plurality of printing heads, each drop being printed at a same rotation angle of said rotating printing platter and a single radial position of a printing block;
    measuring actual positions of drops in said first, second and third patterns respectively;
    calculating deviations of said measured actual positions from expected positions;
    calculating calibration position parameters to correct for said deviations; and
    using said calibration parameters to provide a modified print file for printing, the modified print file defining nozzle print positions to correct for said deviations.

2. The method of claim 1, comprising carrying out said calibrating using a set of printing conditions expected in a standard printing operation.

3. The method of claim 2, wherein said conditions include at least one member of the group of conditions consisting of: temperature of printing heads, voltage used on an ink jet producing piezoelectric, platen rotation speed.

4. The method of claim 1, comprising repeating said calibration using non-equidistant nozzles.

5. The method of claim 4, wherein said head patterns comprise between 29 and 39 drops for each one of a plurality of channels.

6. The method of claim 1, comprising modifying at least one of said patterns to avoid using non-operational nozzles.

7. The method of claim 1, comprising printing an indicator near a drop to be detected of said calibration pattern, to point out a location of said pattern.

* * * * *